United States Patent
Kitani et al.

(10) Patent No.: US 12,403,624 B2
(45) Date of Patent: Sep. 2, 2025

(54) ADDITIVE MANUFACTURING APPARATUS AND METHOD OF MANUFACTURING THREE-DIMENSIONALLY SHAPED OBJECT

(71) Applicant: CANON KABUSHIKI KAISHA, Tokyo (JP)

(72) Inventors: Koji Kitani, Tokyo (JP); Tsutomu Miki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 515 days.

(21) Appl. No.: 17/557,278

(22) Filed: Dec. 21, 2021

(65) Prior Publication Data

US 2022/0111553 A1    Apr. 14, 2022

Related U.S. Application Data

(63) Continuation of application No. PCT/JP2020/025065, filed on Jun. 25, 2020.

(30) Foreign Application Priority Data

Jul. 1, 2019  (JP) .................................. 2019-123160
Jul. 1, 2019  (JP) .................................. 2019-123161

(51) Int. Cl.
*B28B 1/00* (2006.01)
*B22F 10/28* (2021.01)
(Continued)

(52) U.S. Cl.
CPC .............. *B28B 1/001* (2013.01); *B22F 10/28* (2021.01); *B22F 10/73* (2021.01); *B22F 12/60* (2021.01);
(Continued)

(58) Field of Classification Search
CPC ......... B28B 1/001; B33Y 10/00; B33Y 30/00; B33Y 40/00; C04B 2235/3813;
(Continued)

(56) References Cited

U.S. PATENT DOCUMENTS 8,075,814 B2   12/2011   Fruth et al.
9,073,264 B2   7/2015   Abe et al.
(Continued)

FOREIGN PATENT DOCUMENTS

JP    2003-231183 A    8/2003
JP    2004-143581 A    5/2004
(Continued)

OTHER PUBLICATIONS

International Search Report in International Application No. PCT/JP2020/025065 (Aug. 2020).

*Primary Examiner* — Jeffrey M Wollschlager
(74) *Attorney, Agent, or Firm* — Venable LLP

(57) ABSTRACT

An additive manufacturing apparatus includes a powder-layer forming portion, an energy beam source, a shielding portion, and/or a removal portion. The powder-layer forming portion is configured to form a powder layer by moving between a waiting position and a forming area and supplying powder to the forming area. The energy beam source is configured to irradiate the powder layer with an energy beam. The shielding portion is disposed outside the forming area and between the forming area and the waiting position and configured to reduce powder reaching the powder-layer forming portion, the powder being scattered from the powder layer when the powder layer is irradiated with the energy beam by the energy beam source. The removal portion is configured to remove the powder scattered from the powder layer and having adhered to the powder-layer forming portion.

21 Claims, 19 Drawing Sheets

(51) Int. Cl.
  *B22F 10/73*      (2021.01)
  *B22F 12/60*      (2021.01)
  *B29C 64/153*     (2017.01)
  *B29C 64/20*      (2017.01)
  *B29C 64/214*     (2017.01)
  *B29C 64/35*      (2017.01)
  *B33Y 10/00*      (2015.01)
  *B33Y 30/00*      (2015.01)
  *B33Y 40/00*      (2020.01)

(52) U.S. Cl.
  CPC ............ *B29C 64/153* (2017.08); *B29C 64/20* (2017.08); *B29C 64/214* (2017.08); *B29C 64/35* (2017.08); *B33Y 10/00* (2014.12); *B33Y 30/00* (2014.12); *B33Y 40/00* (2014.12)

(58) Field of Classification Search
  CPC .... C04B 2235/5436; C04B 2235/5472; C04B 35/565; C04B 35/653; C04B 2235/6026; C04B 2235/665; Y02P 10/25; B22F 10/37; B22F 10/73; B22F 12/60; B22F 10/28; B29C 64/153; B29C 64/20; B29C 64/214; B29C 64/35
  See application file for complete search history.

(56) References Cited

U.S. PATENT DOCUMENTS

| | | | |
|---|---|---|---|
| 9,969,002 B2 | 5/2018 | Amaya et al. | |
| 10,549,346 B2 | 2/2020 | Yasuda et al. | |
| 11,420,263 B2* | 8/2022 | Binek | B22F 10/28 |
| 2016/0067929 A1 | 3/2016 | Park | |
| 2017/0144374 A1* | 5/2017 | Ono | B29C 64/35 |
| 2017/0209922 A1* | 7/2017 | Kato | B22D 23/00 |
| 2017/0235293 A1* | 8/2017 | Shapiro | B23K 26/08 |
| | | | 700/166 |
| 2018/0015541 A1* | 1/2018 | Amaya | B22F 10/20 |
| 2018/0043615 A1* | 2/2018 | Höchsmann | B29C 64/35 |
| 2018/0281284 A1* | 10/2018 | Elgar | B29C 64/357 |
| 2018/0298215 A1 | 10/2018 | Andersen et al. | |
| 2018/0339467 A1* | 11/2018 | Donovan | B29C 64/218 |
| 2019/0099914 A1 | 4/2019 | Kitani et al. | |
| 2019/0337229 A1* | 11/2019 | Madinger | B08B 1/10 |
| 2020/0215751 A1* | 7/2020 | Barnes | B29C 64/357 |
| 2020/0338817 A1* | 10/2020 | Murciego Rodriguez | B29C 64/241 |

FOREIGN PATENT DOCUMENTS

| | | |
|---|---|---|
| JP | 2008-510633 A | 4/2008 |
| JP | 2010-132961 A | 6/2010 |
| JP | 2016-055625 A | 4/2016 |
| JP | 2016-121402 A | 7/2016 |
| JP | 2017-177557 A | 10/2017 |
| JP | 2018-008493 A | 1/2018 |
| JP | 2018-009210 A | 1/2018 |
| JP | 2018-187893 A | 11/2018 |
| JP | 2019-023327 A | 2/2019 |
| JP | 2019-064226 A | 4/2019 |
| WO | 2011/049143 A1 | 4/2011 |
| WO | 2021/002277 A1 | 1/2021 |

* cited by examiner

L ⇔ ⇒ R

L ⇐ ⇒ R

L ⇐ ⇒ R

L ⇐   ⇒ R

PRIOR ART

PRIOR ART

L ⇐ ⇒ R

L ⇐ ⇒ R

L ⇐ ⇒ R

L ⇐ ⇒ R

ADDITIVE MANUFACTURING APPARATUS AND METHOD OF MANUFACTURING THREE-DIMENSIONALLY SHAPED OBJECT

CROSS-REFERENCE TO RELATED APPLICATIONS

This application is a Continuation of International Patent Application No. PCT/JP2020/025065, filed Jun. 25, 2020, which claims the benefit of Japanese Patent Application No. 2019-123160, filed Jul. 1, 2019, and Japanese Patent Application No. 2019-123161, filed Jul. 1, 2019 which are hereby incorporated by reference herein in their entirety.

BACKGROUND OF THE INVENTION

Field of the Invention

The present invention relates to an additive manufacturing apparatus related to a so-called powder bed fusion, and to a method of manufacturing a three-dimensionally shaped object by using the additive manufacturing apparatus.

Description of the Related Art

In recent years, so-called 3D printers have been increasingly developed, and various methods are being tried for the development. For example, various methods are known, including fused deposition modeling, stereolithography that uses photo-curable resin, and powder bed fusion.

The powder bed fusion is a method that forms a three-dimensionally shaped object by repeating a process to spread material powder of nylon resin, ceramic, or metal, so as to form a layer of the powder, and a process to selectively melt a portion of the powder layer by irradiating the portion with a laser beam. In some cases, another heating means, such as an electron beam, is used instead of the laser beam, for selectively melting a portion of a powder layer.

In the powder bed fusion, metal powder is recently started to be used as the material powder, for manufacturing products required to have high mechanical strength and good thermal conductivity.

In a powder spreading process in which the metal powder is spread so as to form a layer of the metal powder, the layer of the metal powder is formed on a forming stage by using a powder spreading member (recoater), which includes a squeegee and a roller, for example. As one example, there is a method for forming a layer of powder. In this method, when the recoater moves in a going direction in reciprocating motion of the recoater, the squeegee conveys a proper amount of powder onto the forming stage. In addition, when the recoater moves in a return direction in the reciprocating motion, the roller flattens the powder layer so that the powder layer has a thickness of one layer. The distance between the roller and the forming stage is adjusted so as to have an appropriate value. However, the method of forming the powder layer is not limited to this example. After the powder spreading process, a beam irradiation process is performed. In the beam irradiation process, a powder layer is scanned and irradiated with the above-described laser beam or an electron beam for sintering or melting the powder, in accordance with the shape of a desired object to be formed. After the powder layer is irradiated with the beam, the forming stage is lowered by a thickness of one layer, and the powder spreading process is performed again. By repeatedly performing the above-described operations, a three-dimensionally shaped object is formed.

By the way, in a case where an object is formed by using metal powder material, when a powder layer is irradiated with the beam for heating the powder layer, the temperature of the powder layer locally increases to an extremely high temperature. As a result, metal vapor is generated, and condenses into submicrometer-size fine particles in a space above the powder layer. The fine particles are called fumes. The fumes drift along the optical path of the laser beam, and adhere to an irradiation window, through which the laser beam is emitted from the light source toward the powder layer. If the fumes stay in the optical path or adhere to the irradiation window, the fumes will absorb or reflect the laser beam, and affect the intensity of the laser beam, with which the powder layer is irradiated. As a result, the melt and sinter of the powder layer is changed, causing unstable formation of the object.

WO 2011/049143 describes a method for removing the fumes. In this method, a supply nozzle for supplying air-curtain gas and an exhaust nozzle for exhausting the air-curtain gas are disposed so as to face each other via a forming area. The gas flows through the forming area, and removes the fumes.

In addition, Japanese Translation of PCT International Application Publication No. JP-T-2008-510633 describes a method for ensuring the stability of irradiation intensity of the laser beam. In this method, the irradiation window, through which the laser beam is emitted from the light source toward the powder layer, is heated for preventing the fumes from adhering to the irradiation window.

By the way, in recent years, a method of forming an object by using silicon carbide powder has been studied. The silicon carbide is superior to other materials in lightweight property, wear resistance, thermal-shock resistance, and chemical stability; and is expected to be used for a variety of fields although the silicon carbide is a material that is difficult to machine. The silicon carbide has no melting point in normal pressure, and sublimes at or near 2545° C. (or 2700° C. in other findings).

Japanese Patent Application Publication No. 2019-64226 discloses a method in which a powder layer is formed by using a mixed powder that contains silicon carbide powder and metal boride powder whose melting point is lower than the sublimation temperature of the silicon carbide. The powder layer is irradiated with an energy beam for forming an object. The mixture that contains silicon carbide and metal boride becomes eutectic or hypo-eutectic when heated. Thus, in the method, a transient liquid phase of the silicon carbide is produced by heating the mixed powder, so that the powder layer is melted and solidified.

By the way, when solidified layers are stacked on each other by using the above-described silicon carbide powder and the metal boride powder whose melting point is lower than the sublimation temperature of silicon carbide, and by repeating the formation of powder layer and the irradiation of energy beam, an unintentional projection may be formed on a solidified layer. The unintentional projection is hard, and if the projection is formed, the accuracy in shape of the three-dimensionally shaped object deteriorates. In addition, if the projection may interfere with the powder spreading mechanism, the three-dimensionally shaped object may fall over onto the forming stage, or the powder spreading mechanism may be stopped or damaged.

Such problems caused by the projection cannot be solved by the techniques described in WO 2011/049143 and Japanese Translation of PCT International Application Publication No. JP-T-2008-510633 and intended to deal with the fumes.

Thus, it has been desired to achieve a technique that suppresses the unintentional projection from being formed when solidified layers are stacked on each other by using the above-described silicon carbide powder and the metal boride powder whose melting point is lower than the sublimation temperature of silicon carbide, and by repeating the formation of powder layer and the irradiation of energy beam. In addition, it has been desired to achieve a technique that suppresses the unintentional projection from being formed even when other powders are used as raw materials.

SUMMARY OF THE INVENTION

According to a first aspect of the present invention, an additive manufacturing apparatus includes a powder-layer forming portion, an energy beam source, a shielding portion, and/or a removal portion. The powder-layer forming portion is configured to form a powder layer by moving between a waiting position and a forming area and supplying powder to the forming area. The energy beam source is configured to irradiate the powder layer with an energy beam. The shielding portion is disposed outside the forming area and between the forming area and the waiting position and configured to reduce powder reaching the powder-layer forming portion, the powder being scattered from the powder layer when the powder layer is irradiated with the energy beam by the energy beam source. The removal portion is configured to remove the powder scattered from the powder layer and having adhered to the powder-layer forming portion.

According to a second aspect of the present invention, a method of manufacturing a three-dimensionally shaped object includes forming, by a powder-layer forming portion, a powder layer, irradiating the powder layer with an energy beam, and shielding, by a shielding portion, the powder-layer forming portion and/or removing powder having adhered to the powder-layer forming portion. The shielding is performed for reducing powder reaching the powder-layer forming portion, the powder being scattered from the powder layer when the powder layer is irradiated with the energy beam. The removing is performed after the powder layer is irradiated with the energy beam and before a next powder layer is formed.

Further features of the present invention will become apparent from the following description of exemplary embodiments with reference to the attached drawings.

DESCRIPTION OF THE EMBODIMENTS

Figure 1:
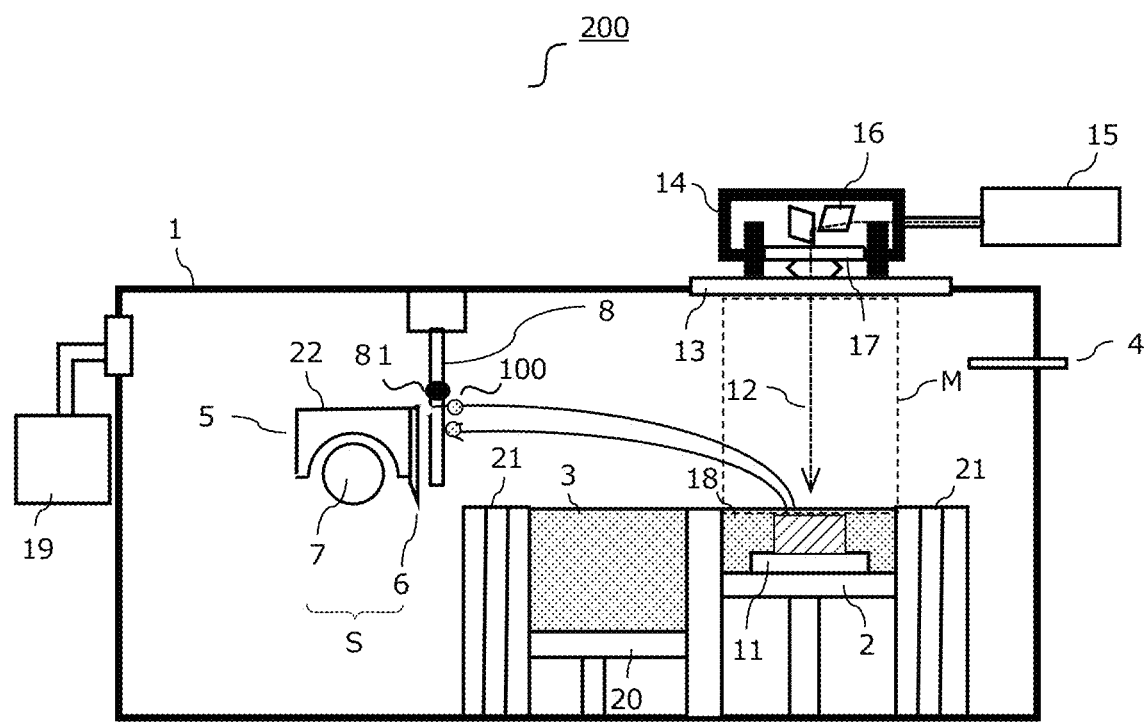
FIG. 1 is a schematic diagram illustrating an additive manufacturing apparatus of a first embodiment in a state where a powder layer is being irradiated with a laser beam.

Hereinafter, an additive manufacturing apparatus of an embodiment of the present invention and a method of manufacturing a three-dimensionally shaped object will be described with reference to the accompanying drawings. Note that in the drawings referred to in the following description, a member having an identical function is denoted by an identical reference numeral, unless otherwise specified.

First Embodiment

FIG. 1 is a schematic diagram illustrating a state where a powder layer 18 is being irradiated with a laser beam 12 in an additive manufacturing apparatus 200 of a first embodiment. First, a configuration of the additive manufacturing apparatus 200 will be described. The additive manufacturing apparatus 200 can form an object by using the powder bed fusion, and includes a chamber 1 into which a gas can be introduced. The chamber 1 is provided with a gas inlet 4 and a vacuum pump 19. The gas inlet 4 is an inlet through which a gas, such as nitrogen gas, is introduced. The vacuum pump 19 is used to exhaust the gas of the chamber 1 when the gas is replaced with new gas.

In the chamber 1, a forming plate 11, a forming stage 2, a powder supply tank 3, a powder supply stage 20, and a recoater 5 are disposed. The forming plate 11 is a base for forming a three-dimensionally shaped object. The forming stage 2 is a stage to which the forming plate 11 is detachably attached. The powder supply tank 3 stores material powder. The powder supply stage 20 supports the powder supply tank 3. The forming stage 2 and the powder supply stage 20 can move up and down, independently from each other.

The recoater 5 serves as a powder-layer forming portion, and moves between a waiting position S and a forming area M. Specifically, the recoater 5 conveys the powder from the powder supply tank 3, which serves as a powder supply portion, onto the forming plate 11; and forms a powder layer 18 having a predetermined thickness that is in a range from about 10 to 100 μm. The waiting position S is a position at which the recoater 5 waits while the powder-layer forming operation is not performed. As illustrated in FIG. 1, the waiting position is separated from the forming stage 2. The forming area M includes an area in which the powder layer 18 is formed on the forming stage 2, and a space (surrounded by dotted lines in FIG. 1) which is located above the area in the vertical direction.

The recoater 5 includes a squeegee 6 supported by a supporting member 22, and a roller 7. The squeegee 6 conveys the powder of the powder supply tank 3, while moving in an R direction, to the vicinity of the forming plate 11 or onto the forming plate 11. The roller 7 conveys the powder, while moving in the R direction or an L direction, onto the forming plate 11 or an object that is being formed. Specifically, the roller 7 compresses or pushes out the powder, and thereby flattens the top surface of the powder layer 18 such that the powder layer 18 has a predetermined thickness. The height of the lower edge surface of the squeegee 6 can be changed as appropriate so that the conveyance of the powder by the squeegee 6 and the flattening of the powder layer 18 by the roller 7 are properly performed. That is, the squeegee 6 can take a posture in which the height of the lower edge portion of the squeegee 6 is equal to the height of the lower edge portion of the roller 7, or a posture in which the height of the lower edge portion of the squeegee 6 is higher than the height of the lower edge portion of the roller 7. The roller 7 moves in the horizontal direction (i.e., the L or R direction) while pressing the powder. Thus, for preventing the height of the lower edge portion of the roller 7 from being changed, the roller 7 is made of a material having high rigidity and resistant to deformation. In addition, a driving apparatus that has high rigidity and that is prevented from moving up and down is used for the horizontal-movement mechanism. In FIG. 1, the recoater 5 includes both the squeegee 6 and the roller 7. However, the recoater 5 may include at least one of the squeegee 6 and the roller 7.

On the left side of the powder supply tank 3 and on the right side of the forming stage 2, collection grooves 21 are disposed for collecting excess powder that is left after a powder layer is formed by the recoater 5.

In the chamber 1, a shielding member 8 is disposed between the waiting position S of the recoater 5 and the forming area M. The shielding member 8 serves as a shielding portion that is a feature of the present embodiment. The shielding member 8 includes an upper plate-like member and a lower plate-like member that are joined with each other via a rotatable joint portion 81. The shielding member 8 takes a bent posture or a straight posture when the joint portion 81 is rotated. In FIG. 1, the shielding member 8 is taking the straight posture, in which the upper plate-like member and the lower plate-like member are located linearly along the vertical direction, via the joint portion 81. The joint portion 81 is disposed above the top portion of the recoater 5, and the shielding member 8 takes the bent posture when the joint portion 81 is rotated. Thus, when the shielding member 8 is taking the bent posture, the shielding member 8 does not interfere with the recoater 5 even when the recoater 5 is moved in the horizontal direction (i.e., the L-R direction). The bent posture is illustrated in FIGS. 2C, and 3A to 3C, which will be described later.

A laser oscillator 15 that serves as an energy beam source, and a scanning optical system 14 are disposed outside the chamber 1. The scanning optical system 14 includes a Galvano mirror 16 and an f-θ lens 17. The Galvano mirror 16 is used to scan a powder layer with the laser beam 12, and the f-θ lens 17 is used to condense the laser beam 12. A transmission window 13 is disposed above the forming plate 11 for transmitting the laser beam 12 emitted from the scanning optical system 14. The laser beam 12 passes through the transmission window 13, and the powder layer 18 on the forming plate 11 is irradiated as appropriate with the laser beam 12.

In the present embodiment, a fiber laser having a wavelength of 1070 nm and a maximum output of 300 W is used, as an example, as the laser oscillator 15. The laser beam 12 emitted from the laser oscillator 15 is focused on a desired position on a surface of the powder layer 18, which is located on the forming plate 11; and the powder layer 18 is scanned with the laser beam, by the Galvano mirror 16 and the f-θ lens 17 that are driven in accordance with the shape data of a three-dimensionally shaped object.

Next, processes to form a three-dimensionally shaped object by using the additive manufacturing apparatus 200 will be described.

First, a material powder that can be used in the present embodiment will be described. In the present embodiment, the material powder may be a mixture of two types of powder. One is silicon carbide (SiC) powder (made by Pacific Rundum Co., Ltd.) having an average particle diameter (Φ) of 14.7 μm; the other is chromium diboride (CrB2) powder (made by JAPAN NEW METALS CO., LTD.) having an average particle diameter (Φ) that is in a range from 3 to 6 μm. The weight of each powder is measured so that the atomic composition ratio of the silicon carbide and the chromium diboride is 70:30 (at. %), and the measured powders are put in a polyethylene bottle and mixed with each other. Then the powder supply tank 3 is filled with the above-described mixed powder.

Then a vacuum is produced in the chamber 1 by using the vacuum pump 19. After the vacuum is fully produced in the chamber 1, an inert gas is introduced into the chamber 1 through the gas inlet 4 such that the pressure in the chamber 1 becomes equal to the atmospheric pressure. Commonly, nitrogen (N2) gas or argon (Ar) gas can be used as the inert gas. In the present embodiment, the N2 gas is used as the inert gas.

Then, the origin of the forming plate 11 in the vertical direction is determined for forming a powder layer. Specifically, the forming stage 2 to which the forming plate 11 is attached is lowered to an area that does not interfere with the operation area of the roller 7 of the recoater 5, and in this state, the recoater 5 reciprocates in the operation area, which includes a space above the forming plate 11, in an L-R direction. Then, the forming stage 2 is lifted step by step. When the forming plate 11 contacts the roller 7, the position (height) of the forming plate 11 is determined as the origin of the forming plate 11. In the present embodiment, a load sensor (not illustrated) is included in the forming stage 2, and the contact between the forming stage 2 and the roller 7 is determined by detecting the increase in load, which is caused by the contact. The increase in load, by which the contact is determined, depends also on the rigidity of the apparatus. In the apparatus of the present embodiment, when a load of 10 N is applied to the forming stage 2, it is determined that the forming plate 11 has contacted the roller 7, and the position of the forming stage 2 is determined as the origin of the forming stage 2.

First, for forming a powder layer on the forming plate 11, the forming stage 2 is lowered by a distance that is slightly larger than the thickness of the powder layer to be formed. For example, if the thickness of the powder layer to be formed is 50 μm, the forming stage 2 is lowered by 70 μm. Then, the powder supply stage 20 that supports the powder supply tank 3 is lifted by 120 μm, pushing up the powder. The posture of the squeegee 6 is adjusted such that the lower edge surface of the squeegee 6 has the same height as that of the lowest portion of the roller 7, and the recoater 5 is moved in the R direction. Specifically, the recoater 5 is moved from the waiting position to the right side of the powder supply tank 3, for conveying a predetermined amount of powder, which is necessary for spreading powder, to the left side of the forming stage 2.

Then, the recoater 5 is moved to the right side of the forming stage 2 in the R direction, while spreading the powder on the forming stage 2.

Finally, the forming stage 2 is lifted by 20 μm, and the recoater 5 is moved in the L direction, in a posture in which the squeegee 6 is lifted such that the lower edge surface of the squeegee 6 is higher than the lowest portion of the roller 7. In this operation, while the powder layer is pressed in the vertical direction by using only the roller 7, the excess powder is pushed out of the forming area, so that the powder layer having a uniform thickness of 50 μm is formed on the forming stage 2. With the above-described operations, one powder layer is formed by the recoater 5, which serves as a powder-layer forming portion.

Then, an irradiation process is performed for irradiating the powder layer, formed as described above, with the laser beam. A forming model is created by using CAD or the like, and the model is converted by using a slicer software, into laser irradiation patterns, each of which corresponds to one layer of the model. The powder layer 18 is irradiated with the laser beam 12 by controlling the Galvano mirror 16 in accordance with the converted laser irradiation pattern. For example, the laser power is 100 W, the laser scan speed is 500 mm/s, and the scan pitch is 0.05 mm. However, the parameters are not limited to these values. Preferably, when the powder layer 18 is irradiated with the laser beam 12, a fumes collector (not illustrated) is activated for collecting the fumes, which are produced when the powder layer 18 is irradiated with the laser beam 12. The powder of one portion, of the powder layer 18, irradiated with the laser beam 12 melts, and solidifies as a bulk body through the eutectic phenomenon described in Japanese Patent Application Publication No. 2019-64226. The other portion of the powder layer 18 is left as the powder layer.

After one powder layer is irradiated with the laser beam 12, the above-described powder spreading process is performed again to spread the mixed powder, which contains silicon carbide and chromium diboride, onto the one powder layer, and the other powder layer is irradiated with the laser beam 12 in accordance with a pattern of the other powder layer. By repeating the above-described operations, one layer that contains silicon carbide as a main component is stacked on another in a sequential manner, so that a three-dimensionally shaped object is formed.

As illustrated in FIG. 1, in the present embodiment, while a powder layer is being irradiated with the laser beam 12, a feature operation is performed. Specifically, the shielding member 8 is taking the straight posture, and prevents the scattered powder 100 from adhering to the surface of the recoater 5. That is, the shielding member 8 is disposed at a position at which the shielding member 8 blocks the trajectory of the powder that flies from the powder layer 18, which is being irradiated with the laser beam 12, toward the recoater 5. Typically, the position at which the shielding member 8 blocks the trajectory of the powder that flies from the powder layer 18 toward the recoater 5 is a position at which the shielding member 8 blocks a parabolic trajectory along which the powder flies from the powder layer 18 toward the recoater 5. However, the position may be a position at which the shielding member 8 blocks a trajectory along which the powder having been reflected from an inner wall of the chamber 1 flies toward the recoater 5. As described later, when the next powder layer is formed by using the recoater 5, the shielding member 8 takes the bent posture so as not to interfere with the recoater 5.

For facilitating the understanding of the feature of the present embodiment, findings by the present inventors on the cause of formation of the unintentional projection, which is formed in a conventional apparatus when solidified layers are stacked on each other by repeating the formation of powder layer and the irradiation of laser beam, will be described.

Figure 11A:
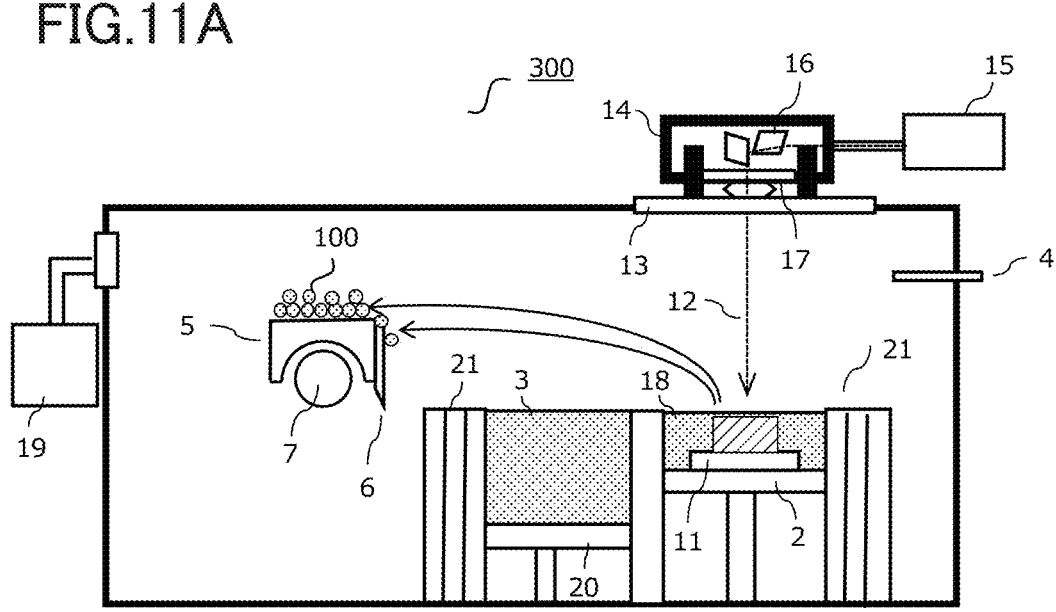
FIG. 11A is a schematic diagram for illustrating a state where a powder layer is being irradiated with a laser beam in a conventional additive manufacturing apparatus.

FIG. 11A is a schematic diagram for illustrating a state where a powder layer is being irradiated with a laser beam in a conventional additive manufacturing apparatus 300. Note that a component that is identical to a component of the apparatus of the first embodiment illustrated in FIG. 1 is given an identical numeral and the description thereof will be omitted. In addition, the conventional additive manufacturing apparatus 300 does not include the shielding member 8.

The present inventors have found that when the powder layer 18 is irradiated with the laser beam 12 in the conventional additive manufacturing apparatus 300 after the powder layer 18, which is made of the mixed powder of silicon carbide and chromium diboride, is formed, the powder around the portion having been irradiated with the laser beam 12 flies to the recoater 5. As schematically illustrated in FIG. 11A, the powder 100 that had flied to the recoater 5 adhered to a side surface of the recoater 5, and deposited on the top surface of the supporting member 22 that supports the recoater 5. As a result of having examined the powder 100 that adhered to the side surface of the recoater 5 and deposited on the top surface of the supporting member 22, the composition of the powder 100 was identical to the composition of the material powder used for the powder layer 18.

Figure 13:
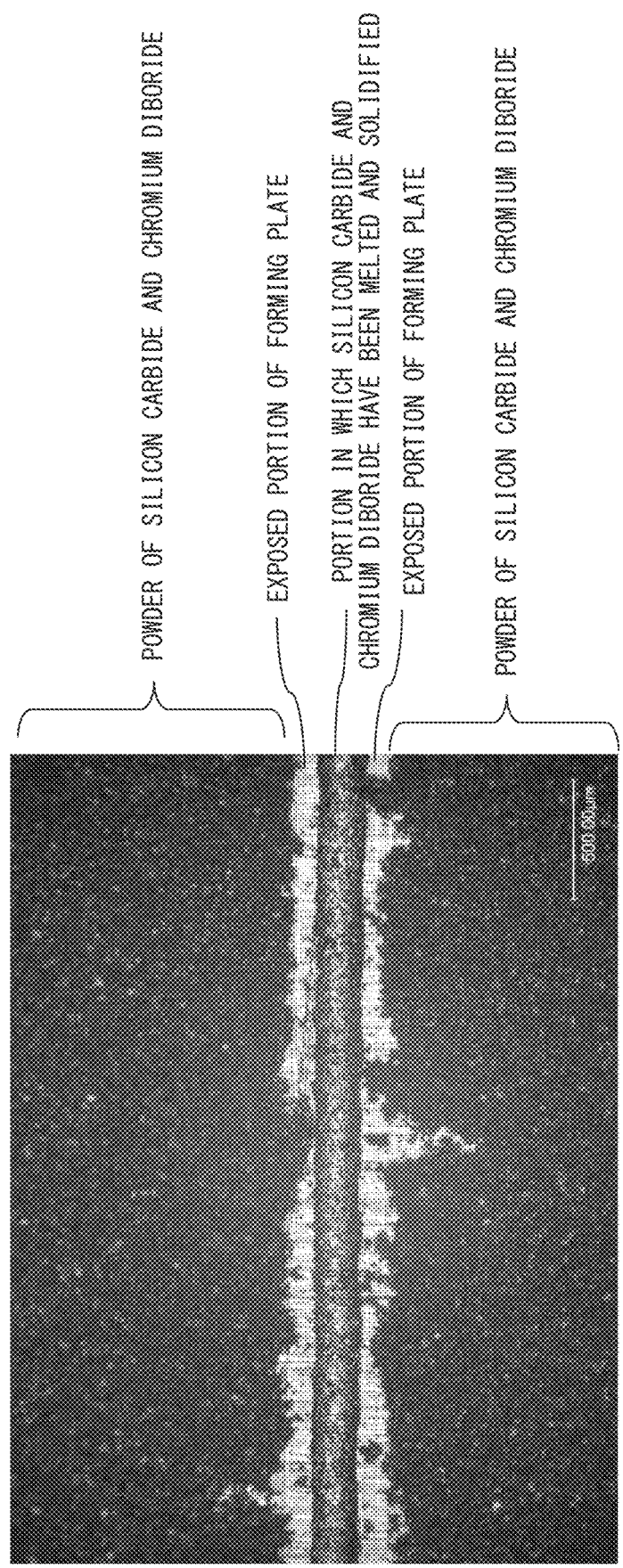
FIG. 13 is a photograph of a surface of a powder layer taken after the powder layer is irradiated with a laser beam.

FIG. 13 is a microscope photograph (plan view) of a powder layer made of the mixed powder of silicon carbide and chromium diboride. The photograph was taken from above the powder layer after the powder layer was linearly scanned by the laser beam. In a portion (i.e., a center line in FIG. 13) of the powder layer irradiated with the laser beam, an object (solid) that contains silicon carbide and chromium diboride was formed. However, in the vicinity of the object, the powder disappeared and the forming plate was exposed. In the photograph, whitish portions along the line are exposed portions of the forming plate. It is supposed that the powder on the exposed portion of the forming plate flied and at least one portion of the powder reached the recoater 5.

Figure 14:
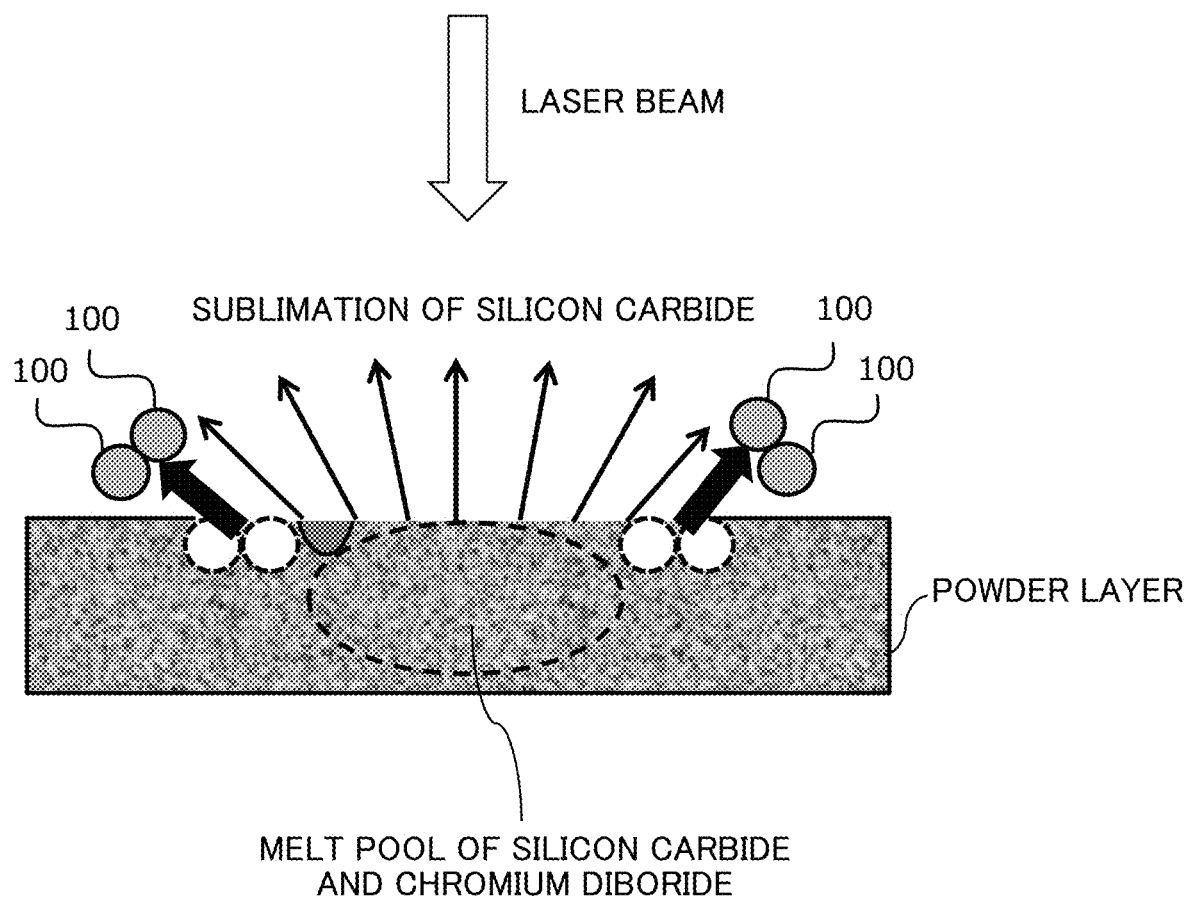
FIG. 14 is a schematic diagram for illustrating a state where the powder is scattered due to the sublimation.

Next, the mechanism that causes the powder around the portion irradiated with the laser beam to scatter will be described with reference to FIG. 14. As illustrated in FIG. 14, when the mixed powder of silicon carbide and chromium diboride is irradiated with the laser beam, a locally-heated portion of the mixed powder becomes a liquid state (hereinafter referred to also as a melt pool) through the eutectic phenomenon. In the process from the powder state to the liquid state, part of the silicon carbide sublimes without undergoing the eutectic process. That is, there is silicon carbide powder in the vicinity of the surface of the portion of the powder layer, and when the portion of the powder layer is irradiated with the laser beam, the temperature of the silicon carbide powder increases rapidly and exceeds the sublimation temperature of the silicon carbide. As a result, part of the silicon carbide powder sublimes before forming the eutectic together with the chromium diboride. Thus, it is assumed that since the sublimation of the part of the silicon carbide powder blew the powder 100 around the portion irradiated by the laser beam, the powder around the line disappeared.

This phenomenon increased significantly when the energy transmitted from the laser beam to the powder was increased. Thus, the laser energy was decreased within an allowable range for forming an object, but the powder 100 was not completely prevented from flying to the recoater 5. In addition, while the powder layer was being irradiated with the laser beam, the flow rate (i.e., flow rate of the intake and exhaust gas) of the air curtain, which flew through the space above the forming stage for dealing with the fumes, was adjusted within an allowable range that does not affect the formation of the powder layer, but the powder 100 was not prevented from adhering to and depositing on the recoater 5. This is because the mass and the momentum of the powder 100, blown by the sublimation, are significantly larger than those of the drifting fumes, which are submicrometer-size fine particles into which the vapor has condensed.

As schematically illustrated in FIG. 11A, if the amount of the powder 100 having adhered to a side surface of the recoater 5 or having deposited on the top surface of the recoater 5 reaches a certain amount while a powder layer is irradiated with the laser beam, lumps of the powder 100 may fall onto the next powder layer when the next powder layer is being formed by the recoater 5 after the previous powder layer is irradiated with the laser beam.

Figure 11B:
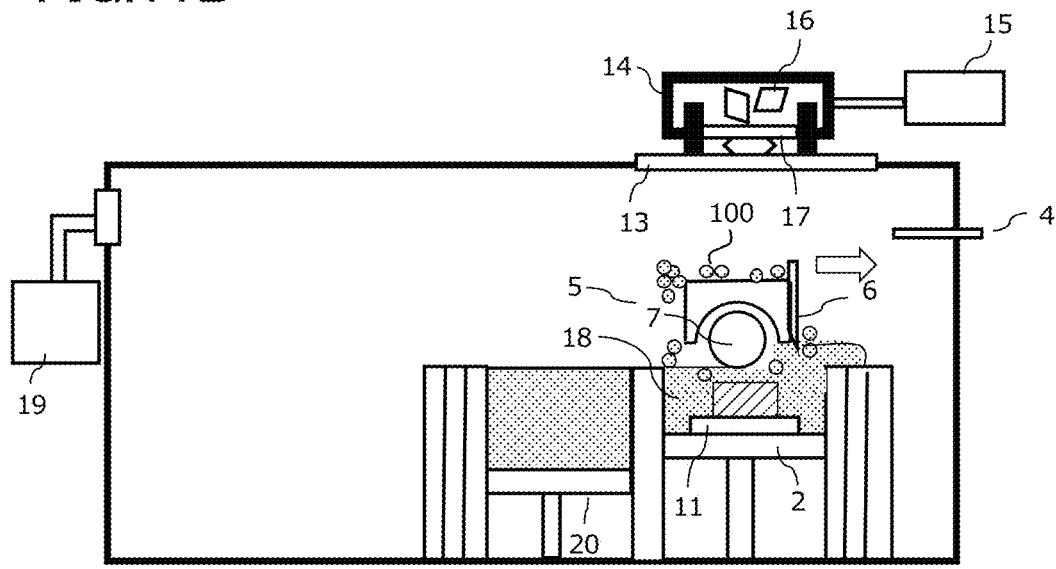
FIG. 11B is a schematic diagram for illustrating a state where the powder having adhered to the recoater is falling in the conventional additive manufacturing apparatus when a powder layer is being formed.

FIG. 11B is a schematic diagram for illustrating a state where the next powder layer is being formed by the recoater 5. In this state, the powder 100 has adhered to the side surface of the recoater 5, and has deposited on the top surface of the recoater 5 (hereinafter, the phrase may be simply expressed as "the powder 100 has adhered to and deposited on the recoater 5"). The recoater 5 is moved in the R direction as illustrated in FIG. 11B, and then moved in the L direction for forming the powder layer. While the recoater 5 is moved horizontally on the forming stage 2, the powder 100 that has adhered to and deposited on the recoater 5 may form lumps, and the lumps may fall. In particular, if the lumps of the powder 100 fall onto the powder layer from the trailing edge side (i.e., right side in FIG. 11B) of the recoater 5 when the recoater 5 is moved, for the last time, toward the waiting position in the L direction while pressing the powder layer, the lumps of the powder 100, which have fallen, form a pile of the powder 10 on the powder layer and the pile is left because the roller 7 has already passed the position of the pile.

Figure 12A:
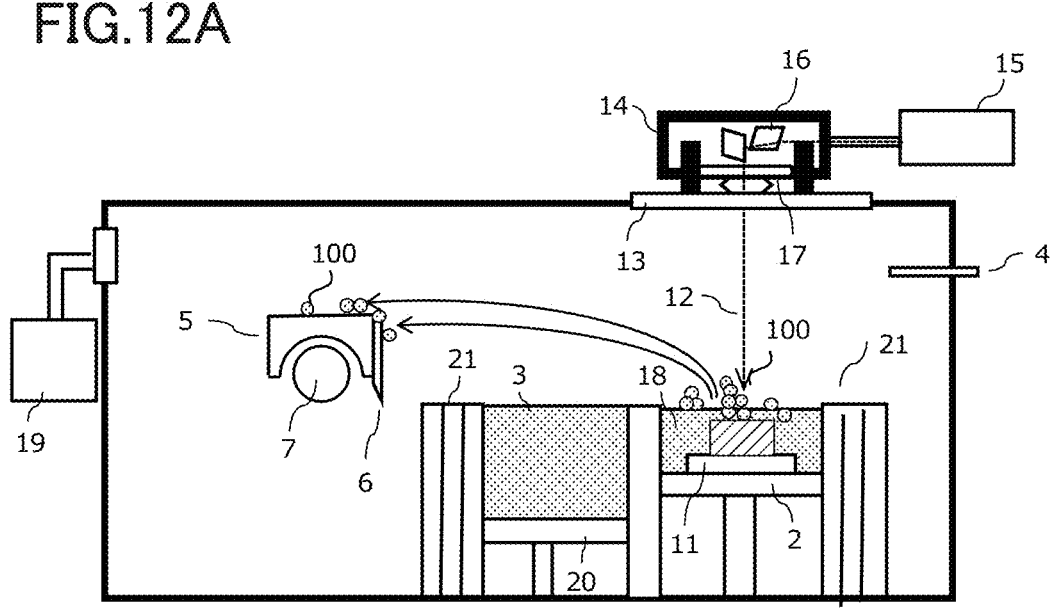
FIG. 12A is a schematic diagram for illustrating a state where the powder layer is being irradiated with the laser beam in the conventional additive manufacturing apparatus, in a state where the powder has fallen and is left on the powder layer.
Figure 12B:
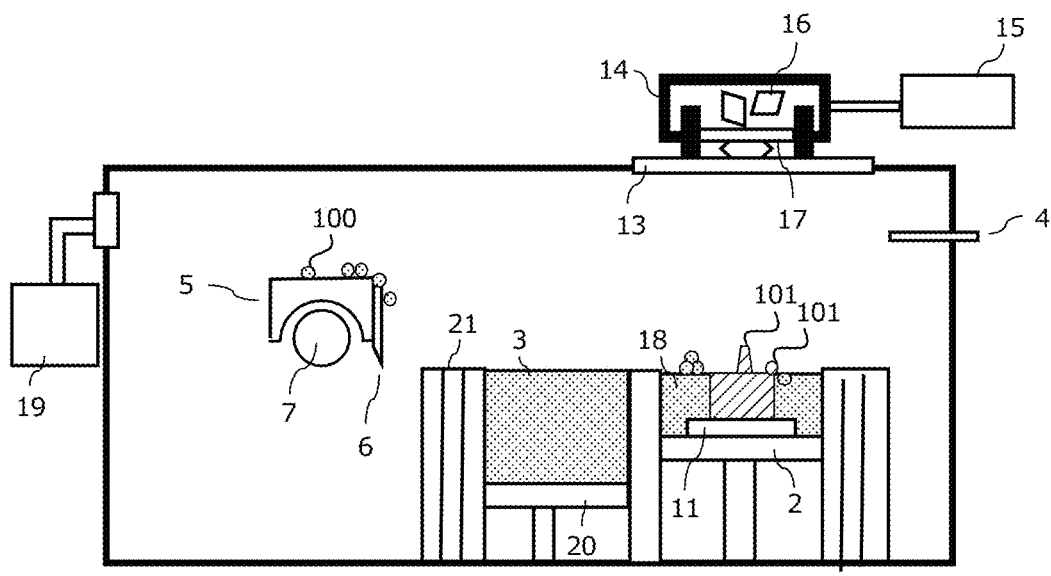
FIG. 12B is a schematic diagram for illustrating a state where a projecting portion is formed in the conventional additive manufacturing apparatus.

FIG. 12A is a diagram schematically illustrating a state where the powder layer 18 is being irradiated with the laser beam 12 for forming the next solidified layer, in a state where the pile of lumps of the powder 100 is formed on the powder layer 18. As illustrated in FIG. 12B, if the pile of lumps of the powder 100 is irradiated with the laser beam 12, an unintentional hard projecting portion 101 is formed on the three-dimensionally shaped object. If the projecting portion 101 is formed, the accuracy in shape of the three-dimensionally shaped object will deteriorate. In addition, in this case, when the next powder layer is formed, the projecting portion 101 may interfere with the recoater 5. As a result, the three-dimensionally shaped object may fall over on the forming stage, and the recoater 5 may be stopped or damaged.

Figure 2A:
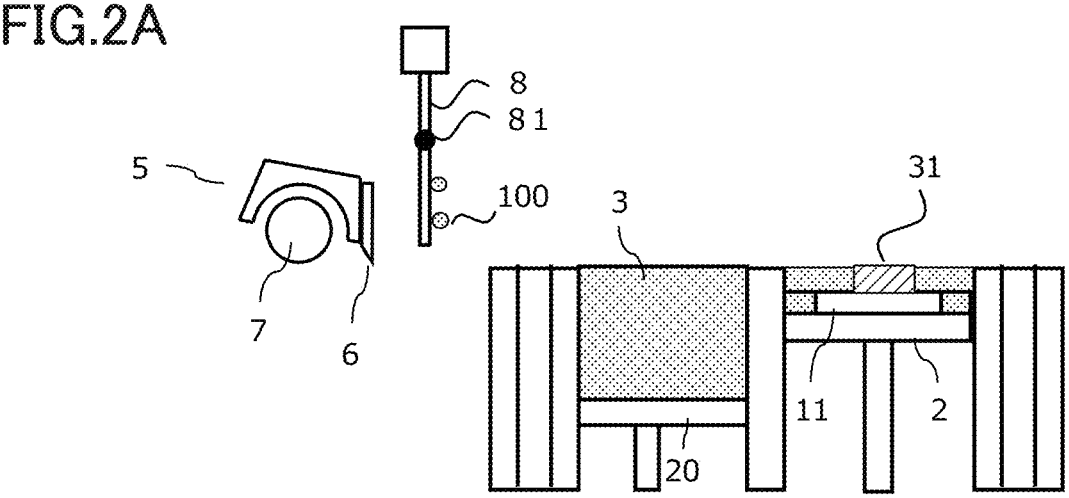
FIG. 2A is a schematic diagram illustrating a state after the powder layer is irradiated with the laser beam in the first embodiment.

In the present embodiment, however, the trajectory of the powder 100 that flies toward the recoater 5 while the powder layer is being irradiated with the laser beam is blocked by the shielding member 8, as illustrated in FIG. 1. Thus, since the powder 100 does not reach the recoater 5 located at the waiting position, the powder 100 does not adhered to and deposit on the recoater 5. FIG. 2A schematically illustrates a state of the recoater 5, observed after the powder layer is irradiated with the laser beam and a solidified portion 31 that constitutes the three-dimensionally shaped object is formed. As illustrated in FIG. 2A, the powder 100 has not adhered to and deposited on the recoater 5.

In the present embodiment, after a powder layer is irradiated with the laser beam, the next powder layer is formed on the forming stage in the below-described procedure, by using the recoater 5.

Figure 2B:
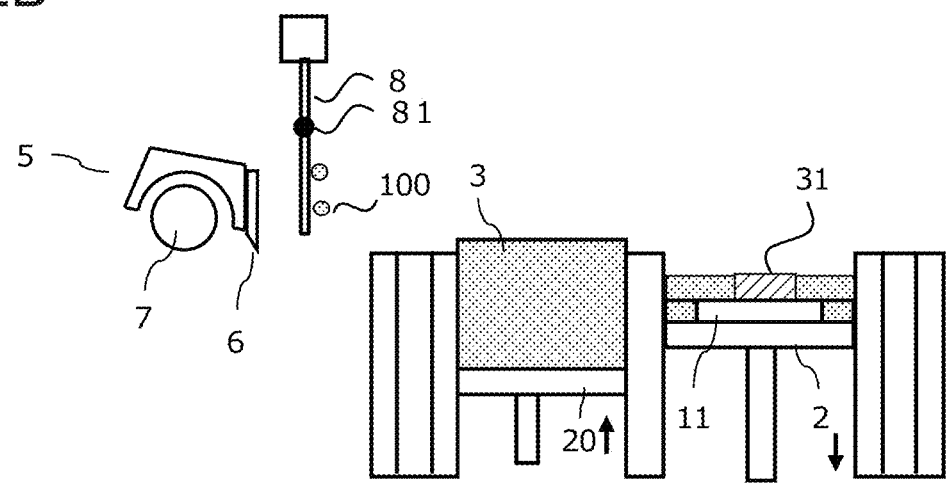
FIG. 2B is a schematic diagram illustrating one stage of a powder-layer forming process of the first embodiment.

First, as illustrated in FIG. 2B, the powder supply stage 20 that supports the powder supply tank 3 is lifted for pushing up the powder, and the forming stage 2 is lowered.

Figure 2C:
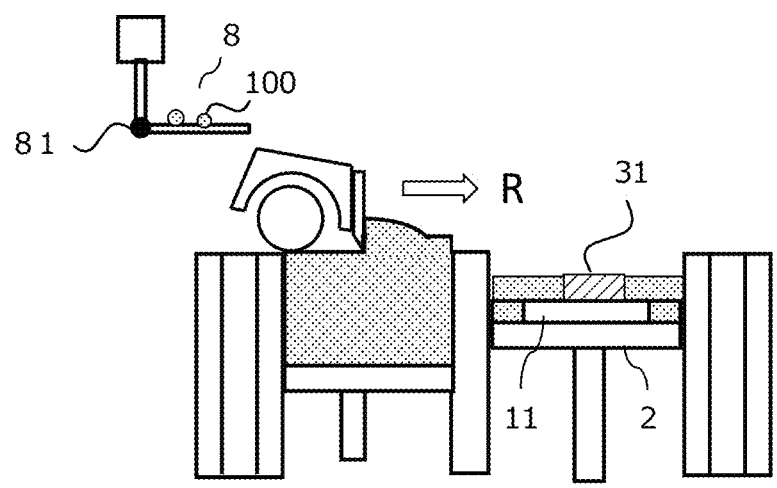
FIG. 2C is a schematic diagram illustrating a state where a recoater is moved, in the first embodiment, while a shielding member is bent.

Then, as illustrated in FIG. 2C, the posture of the shielding member 8 is changed from the straight posture to the bent posture by rotating the joint portion 81. That is, the lower edge of the shielding member 8 is set higher than the upper edge of the recoater 5. With this operation, the recoater 5 does not interfere with the shielding member 8 even when the recoater 5 is moved horizontally. The posture of the recoater 5 is adjusted such that the lower edge surface of the squeegee 6 has the same height as that of the lowest portion of the roller 7, and the recoater 5 is moved in the R direction. Specifically, the recoater 5 is moved in the R direction for conveying a predetermined amount of powder, which is necessary for spreading powder, to the left side of the forming stage 2.

Figure 3A:
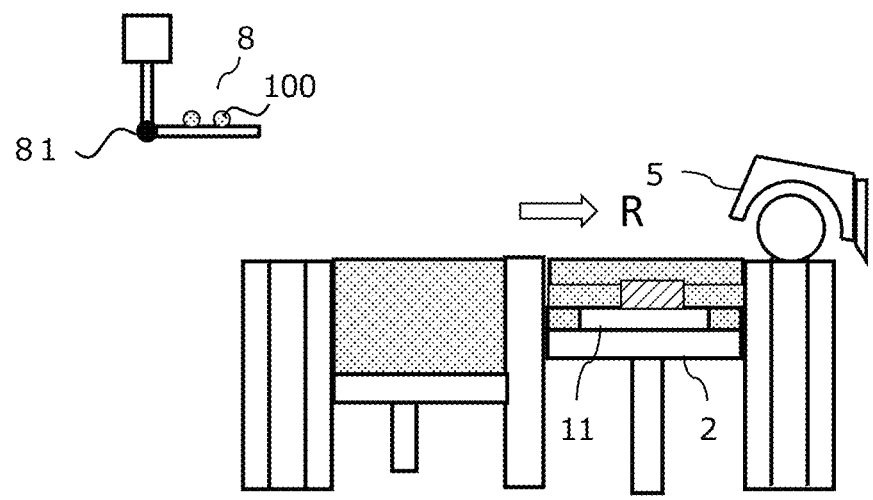
FIG. 3A is a schematic diagram illustrating one stage of the powder-layer forming process of the first embodiment.

Then, as illustrated in FIG. 3A, the recoater 5 is moved to the right side of the forming stage 2 in the R direction, while spreading the powder on the forming stage 2.

Figure 3B:
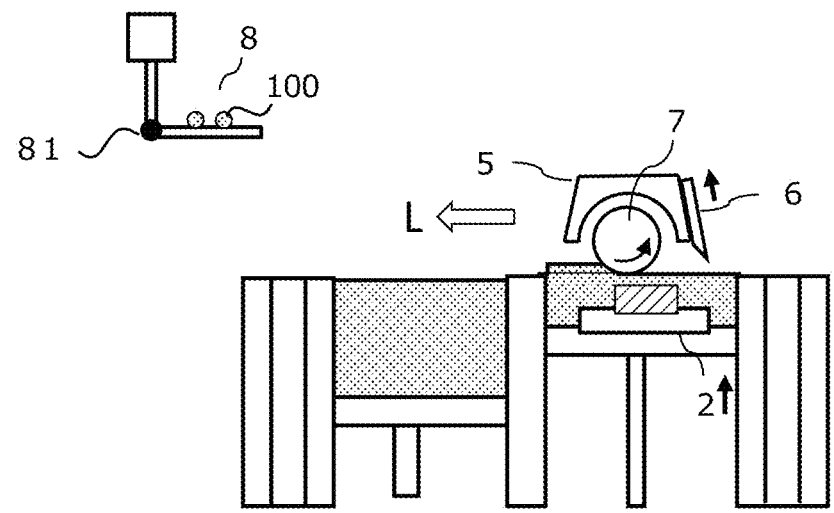
FIG. 3B is a schematic diagram illustrating one stage of the powder-layer forming process of the first embodiment.

Then, as illustrated in FIG. 3B, the forming stage 2 is lifted, and the recoater 5 is moved in the L direction, in a posture adjusted such that the lower edge surface of the squeegee 6 is set higher than the lowest portion of the roller 7. The roller 7 forms a powder layer that has a uniform thickness, while pressing the powder layer.

Figure 3C:
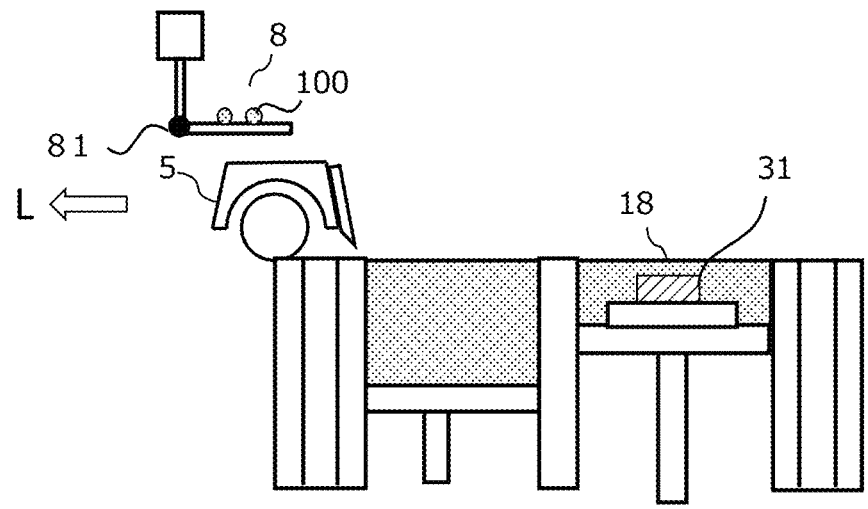
FIG. 3C is a schematic diagram illustrating one stage of the powder-layer forming process of the first embodiment.

Then, as illustrated in FIG. 3C, the recoater 5 is further moved in the L direction, toward the waiting position. When the recoater 5 is moved toward the waiting position, the recoater 5 does not interfere with the shielding member 8 because the shielding member 8 keeps the bent posture.

Figure 4:
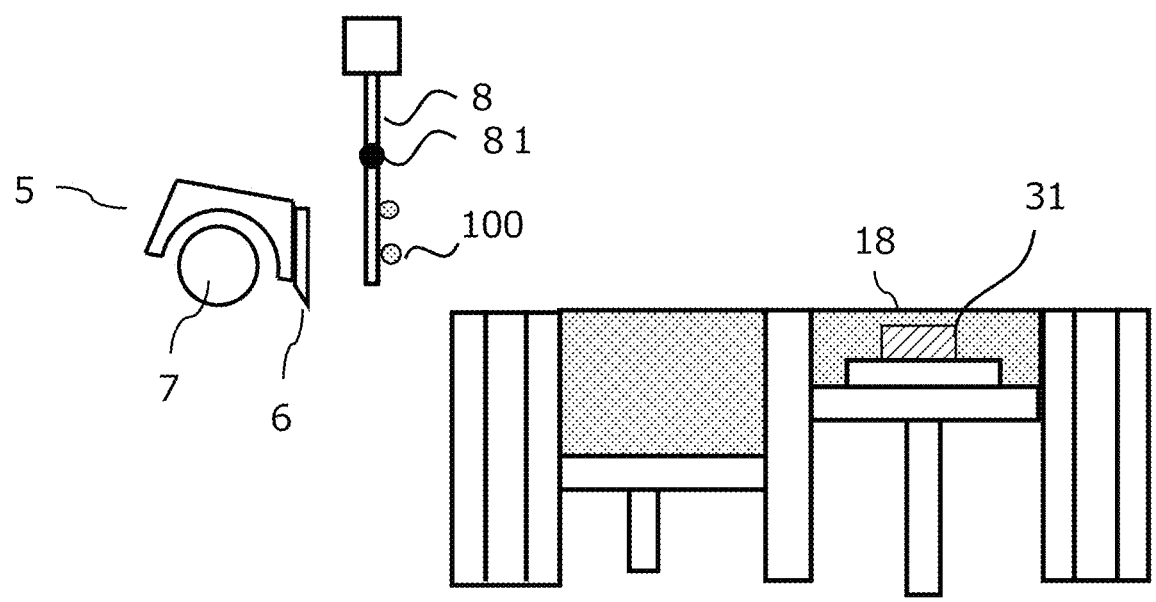
FIG. 4 is a schematic diagram illustrating a stage m which the formation of a powder layer is completed in the first embodiment.

As illustrated in FIG. 4, after the recoater 5 returns to the waiting position, the shielding member 8 takes the straight posture again before the irradiation of the laser beam is started, for shielding the recoater 5 from the powder that flies when the next powder layer is irradiated with the laser beam.

In the present embodiment, since the shielding member 8 prevents the flying powder 100 from adhering to and depositing on the recoater 5, there is no case in which the powder 100 having adhered to the recoater 5 falls onto the powder layer 18 and forms a pile of powder as in the conventional apparatus. That is, in the present embodiment, there is no case in which a large amount of powder 100 adheres to and deposits on the recoater and the recoater moves in the forming area. Thus, there is no fear that the lumps of excess powder 100 fall onto the powder layer 18, which is formed so as to have a uniform thickness.

Thus, it is possible to suppress the unintentional projection from being formed when solidified layers are stacked on each other by using the above-described silicon carbide powder and the metal boride powder whose melting point is lower than the sublimation temperature of silicon carbide, and by repeating the formation of powder layer and the irradiation of energy beam.

In the above-described embodiment, an object was formed by stacking 400 layers on each other. The maximum dimensions of the object were 30×40×20 mm, and the object was formed in an area whose maximum dimensions were 30×40 mm. The formation of the object was completed without being stopped. The roller 7 was not damaged, and the accuracy in shape of the three-dimensionally shaped object satisfied predetermined specifications. When the apparatus was checked during the formation of the object and before the formation of one powder layer, there was almost no scattered object (i.e., powder used for forming the object) on the surface of the recoater 5. As described above, the forming apparatus of the present embodiment reduces the scattered object from depositing on the recoater 5 and falling from the recoater 5 onto the forming area. Thus, the forming apparatus of the present embodiment performs highly stable forming operation and has excellent productivity.

In the above-described embodiment, most of the powder 100 that has collided with the shielding member 8 adheres to the shielding member 8, as illustrated in FIG. 2A. The powder 100 having adhered to and deposited on the shielding member 8 may fall when the posture of the shielding member 8 is changed from the straight posture to the bent posture, or from the bent posture to the straight posture. However, if the posture of the shielding member 8 is changed at a timing at which the recoater 5 is separated from the shielding member 8 in the horizontal direction, the powder 100 does not adhere to the recoater 5 even if the powder 100 falls. In addition, at a timing at which the recoater 5 passes through a space directly below the shielding member 8, the shielding member 8 is taking the bent posture, and thus the powder 100 stays on the upper side of the bent shielding member 8 as illustrated in FIG. 2C and hardly falls. Thus, the powder 100 does not adhere to the recoater 5. Note that the powder 100 having adhered to the shielding member 8 can be discharged to the outside, when the chamber is opened after an object is formed, by sucking the powder 100 by using, for example, a cleaner for removing dust.

In a modification of the present embodiment, the powder 100 having collided with the shielding member 8 does not adhere to the shielding member 8. For example, the surface of the shielding member 8 may be coated with a material to which the powder 100 hardly adheres. In another case, the shielding member 8 may be provided with a mechanism that applies ultrasonic vibration to the shielding member 8, or the shielding member 8 may be provided with a mechanism that blows gas on the surface of the shielding member 8. In such a case, the powder 100 having collided with the shielding member 8 falls while the recoater 5 is located at the waiting position. Thus, as in a later-described embodiment illustrated in FIGS. 9A and 9B, a collection container 69 may be disposed at a position directly below a curtain 59, for collecting the falling powder 100. The collection container 69 is connected with a dust collector for preventing the fallen object from scattering in the apparatus again. Note that the collected powder 100 may be reused as the material powder for forming an object.

Second Embodiment

Next, an additive manufacturing apparatus 400 of a second embodiment will be described with reference to FIGS. 5A and 5B. The same features as those of the first embodiment will be omitted.

In the above-described first embodiment, the shielding member 8 that can be bent and stretched by the joint portion 81 is disposed as a shielding portion. In the present embodiment, a shielding plate 9 is disposed as a shielding portion. The shielding plate 9 does not bend and stretch, but can move up and down like a shutter. In addition, in the above-described first embodiment, the shielding member 8 that serves as a shielding portion is disposed closer to the waiting position of the recoater 5 than to the powder supply tank 3. In the present embodiment, however, the shielding plate 9 that serves as a shielding portion is disposed above the collection groove 21 that is disposed on the left side of the powder supply tank 3.

Figure 5A:
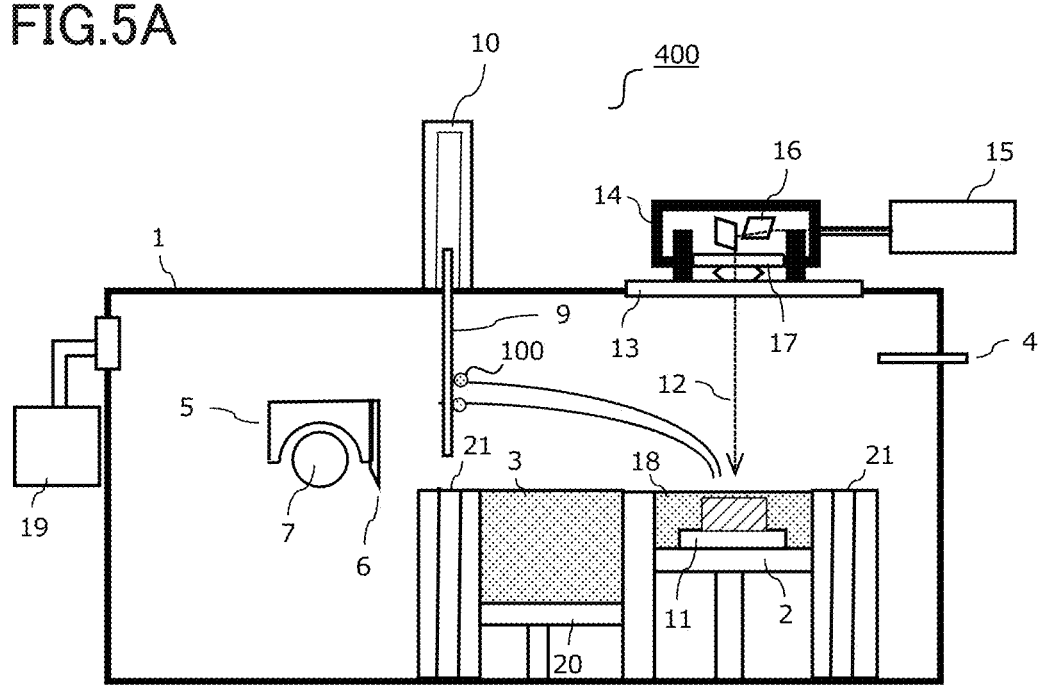
FIG. 5A is a schematic diagram illustrating a state where a powder layer is being irradiated with a laser beam in a second embodiment.

As illustrated in FIG. 5A, in the present embodiment, while the powder layer 18 is being irradiated with the laser beam 12, the shielding plate 9 is lowered and located at a lower position for preventing the flying powder 100 from adhering to the recoater 5. The powder 100 that collides with the shielding plate 9 and falls is collected by the collection groove 21.

Figure 5B:
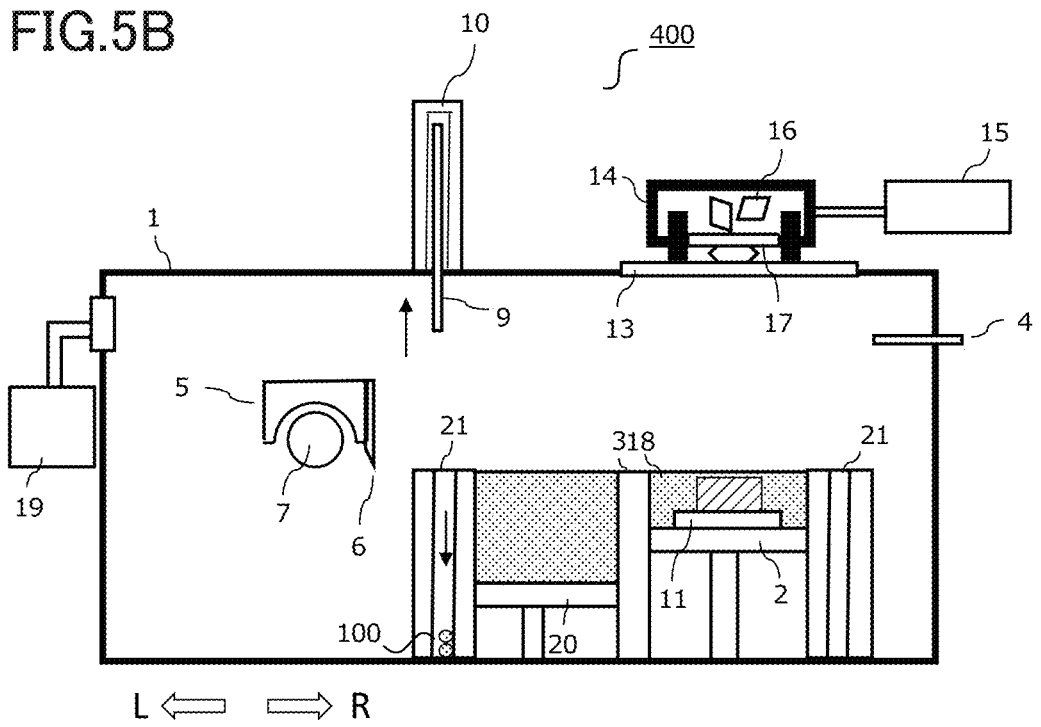
FIG. 5B is a schematic diagram illustrating a stage previous to a powder-layer forming process of the second embodiment.

After the powder layer 18 is irradiated with the laser beam 12, the shielding plate 9 is lifted to a position, as illustrated in FIG. 5B, at which the lower edge of the shielding plate 9 does not interfere with the upper edge of the recoater 5 even when the recoater 5 is moved in the horizontal direction (i.e., the L-R direction). The shielding plate 9 is housed by a shielding-plate storage portion 10 whose interior contains the atmosphere that is the same as that contained in the chamber 1. The shielding-plate storage portion 10 has a scraper (not illustrated) that is disposed at a lower edge of the shielding-plate storage portion 10, and that slides on the surface of the sliding plate 9. Thus, when the shielding plate 9 is lifted, the powder 100 having adhered to the surface of the shielding plate 9 is scraped down by the scraper. The powder 100 scraped down from the shielding plate 9 is collected by the collection groove 21.

After the shielding plate 9 is lifted, a new powder layer is formed by using the recoater 5, as in the first embodiment. After the new powder layer is formed and the recoater 5 returns to the waiting position, the shielding plate 9 is lowered again to a position at which the shielding plate 9 blocks the trajectory along which the powder 100 flies.

In the second embodiment, an object was formed by stacking 400 layers on each other. The maximum dimensions of the object were 30×40×20 mm, and the object was formed in an area whose maximum dimensions were 30×40 mm. The formation of the object was completed without being stopped. The roller 7 was not damaged, and the accuracy in shape of the three-dimensionally shaped object satisfied predetermined specifications. When the apparatus was checked during the formation of the object and before the formation of one powder layer, there was almost no scattered object (i.e., powder used for forming the object) on the surface of the recoater 5. As described above, the forming apparatus of the present embodiment prevents the scattered object from depositing on the recoater 5 and falling from the recoater 5 onto the forming area. Thus, the forming apparatus of the present embodiment performs highly stable forming operation and has excellent productivity.

In the present embodiment, not only the excess powder left after the formation of a powder layer, but also the powder 100 blocked by the shielding plate 9 can be collected by the collection groove 21. Note that the collected powder 100 may be reused as the material powder for forming an object.

Third Embodiment

Next, a third embodiment that is a modification of the second embodiment will be described with reference to FIGS. 6A and 6B. The same features as those of the second embodiment will be omitted.

In the above-described second embodiment, the shielding plate 9 that can be moved up and down is disposed above the collection groove 21, which is disposed on the left side of the powder supply tank 3 (that is, disposed out of a space above the powder supply tank 3). In the present embodiment, the shielding plate 9 that can be moved up and down is disposed above the powder supply tank 3.

Figure 6A:
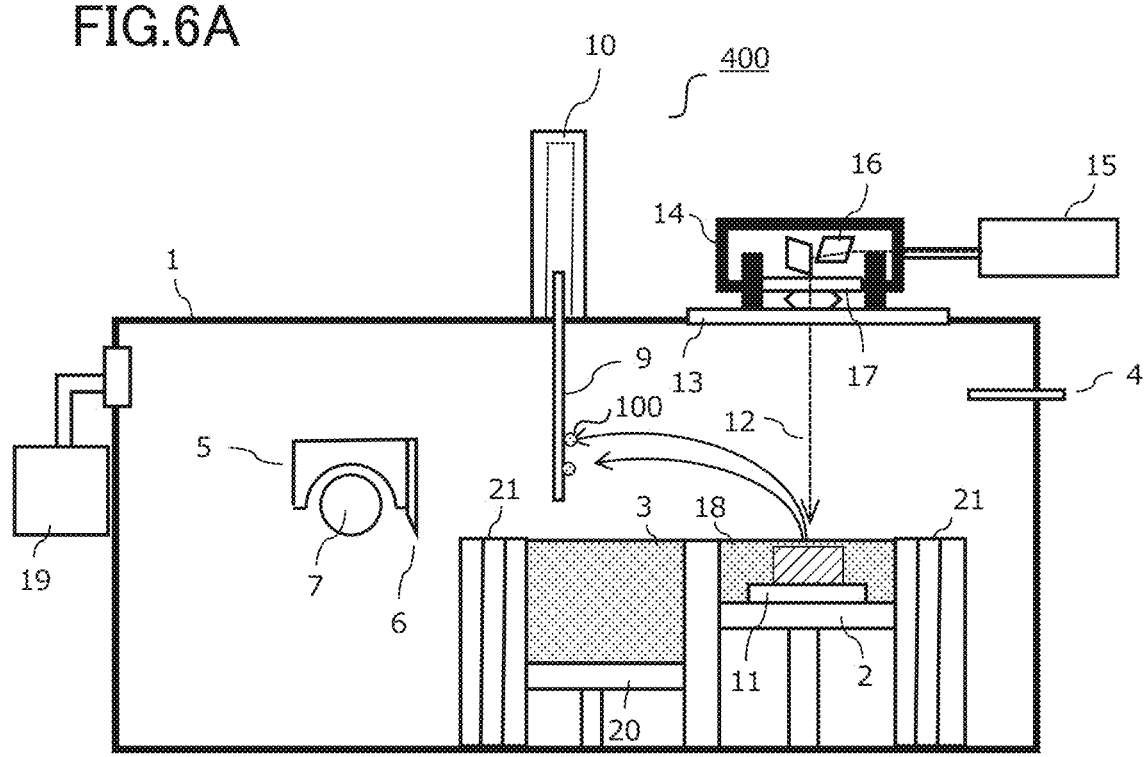
FIG. 6A is a schematic diagram illustrating a state where a powder layer is being irradiated with a laser beam in a third embodiment.

Also in the present embodiment, while the powder layer 18 is being irradiated with the laser beam 12, the shielding plate 9 is lowered and located at a lower position, as illustrated in FIG. 6A, for preventing the flying powder 100 from adhering to the recoater 5. The powder 100 that collides with the shielding plate 9 and falls is collected by the powder supply tank 3.

As described previously, the powder 100 has the same composition as that of the material powder stored in the powder supply tank 3. Thus, any problem does not occur even if the material powder is mixed with the powder 100.

Figure 6B:
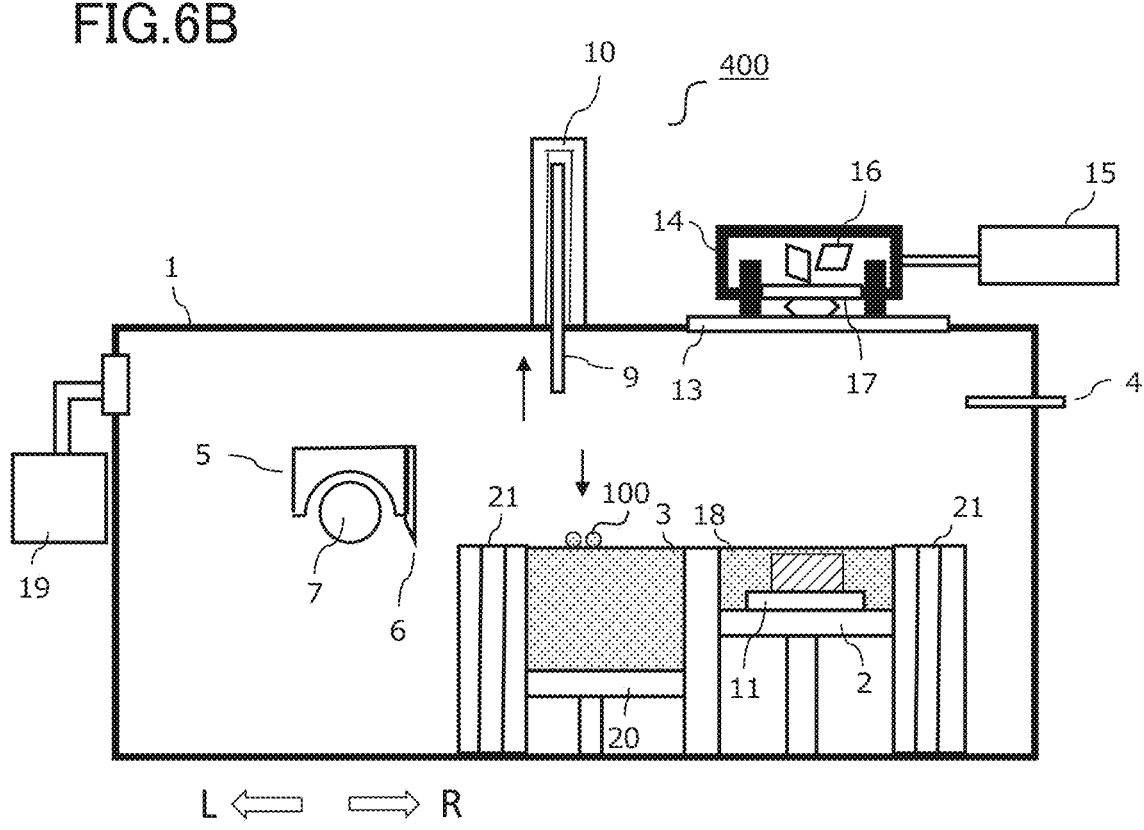
FIG. 6B is a schematic diagram illustrating a stage previous to a powder-layer forming process of the third embodiment.

After the powder layer 18 is irradiated with the laser beam 12, the shielding plate 9 is lifted to a position, as illustrated in FIG. 6B, at which the lower edge of the shielding plate 9 does not interfere with the recoater 5 even when the recoater 5 is moved in the horizontal direction (i.e., the L-R direction). The shielding plate 9 is housed by the shielding-plate storage portion 10 whose interior contains the atmosphere that is the same as that contained in the chamber 1. The shielding-plate storage portion 10 has a scraper (not illustrated) that is disposed at a lower edge of the shielding-plate storage portion 10, and that slides on the surface of the shielding plate 9. Thus, when the shielding plate 9 is lifted, the powder 100 having adhered to the surface of the shielding plate 9 is scraped down by the scraper. The powder 100 scraped down from the shielding plate 9 falls into the powder supply tank 3, and is reused as the material powder.

In the third embodiment, an object was formed by stacking 400 layers on each other. The maximum dimensions of the object were 30×40×20 mm, and the object was formed in an area whose maximum dimensions were 30×40 mm. The formation of the object was completed without being stopped. The roller 7 was not damaged, and the accuracy in shape of the three-dimensionally shaped object satisfied predetermined specifications. When the apparatus was checked during the formation of the object and before the formation of one powder layer, there was almost no scattered object (i.e., powder used for forming the object) on the surface of the recoater 5. As described above, the forming apparatus of the present embodiment suppresses the scattered object from depositing on the recoater 5 and falling from the recoater 5 onto the forming area. Thus, the forming apparatus of the present embodiment performs highly stable forming operation and has excellent productivity.

In the present embodiment, the powder 100 that has collided with the shielding plate 9 can be mixed to the material powder, and reused as the material powder, without disposing any additional collection mechanism.

Fourth Embodiment

Figure 7:
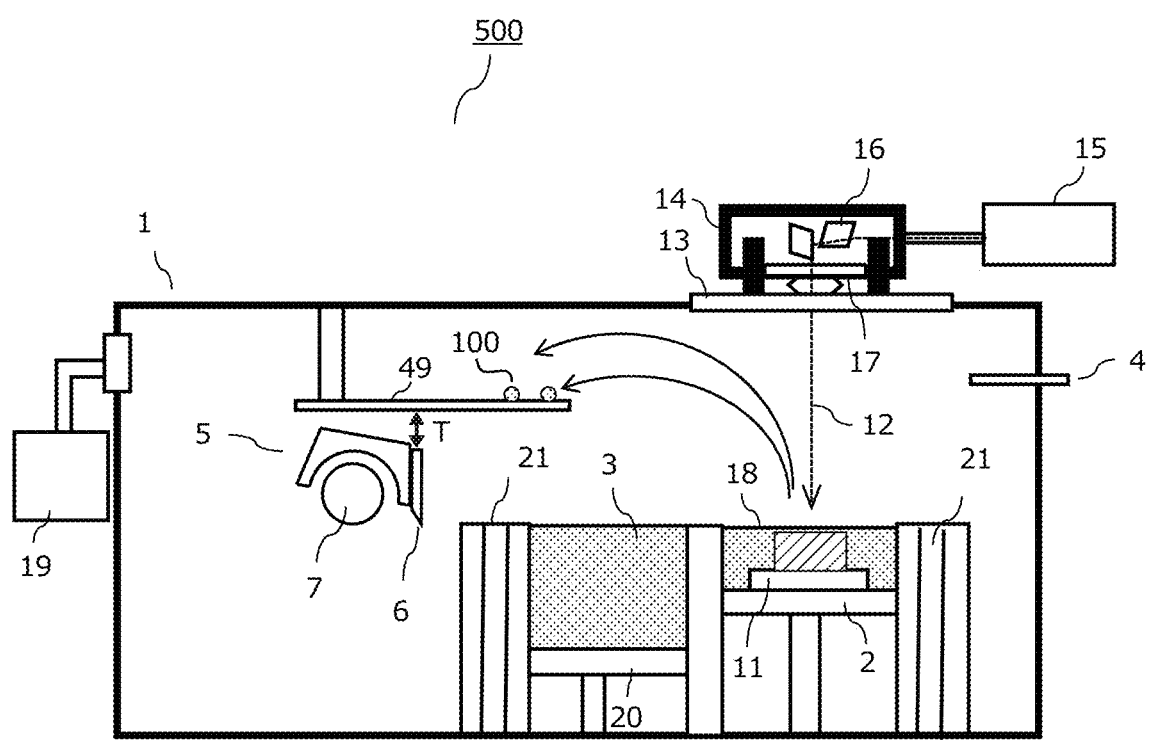
FIG. 7 is a schematic diagram illustrating a state where a powder layer is being irradiated with a laser beam in a fourth embodiment.

Next, an additive manufacturing apparatus 500 of a fourth embodiment will be described with reference to FIG. 7. The same features as those of the first embodiment will be omitted.

In the above-described first to third embodiments, a movable member is used as a shielding portion. In the present embodiment, a fixed member is used as a shielding portion. That is, in the present embodiment, a shielding top plate 49 is disposed. The shielding top plate 49 extends, like an eave, from a position above the waiting position of the recoater 5, toward the forming plate. The shielding top plate 49 is fixed to the ceiling of the chamber 1, and shields the whole of the recoater 5 located at the waiting position, from the flying powder 100. Thus, the length (i.e., length in the horizontal direction in which the recoater 5 moves for spreading powder) and the width (in the direction perpendicular to FIG. 7) of the shielding top plate 49 are larger than those of the recoater 5, and the shielding top plate 49 is disposed so as to cover the whole of the recoater 5. Preferably, the length of the shielding top plate 49 is larger than 1.5 times the length of the recoater 5 in the horizontal direction. In addition, the center of the recoater 5 located at the waiting position is preferably more separated from the forming area than from the center of the shielding top plate 49 in the horizontal direction. Furthermore, a separation distance T between the top surface of the recoater 5 and the shielding top plate 49 at a position closest to the forming area is preferably equal to or smaller than 3 cm, and more preferably, is equal to or smaller than 1 cm. If the separation distance T is equal to or smaller than 3 cm, it is possible to suppress the amount of the powder 100 that passes through a space formed between the recoater 5 and the shielding top plate 49. As a result, while the powder layer 18 is being formed, so much the powder 100 as to form lumps of the powder 100 that will fall onto the powder layer 18 is prevented from depositing on the top surface of the recoater 5. If the separation distance T is equal to or smaller than 1 cm, the powder 100 is more effectively prevented from depositing on the top surface of the recoater 5. In the present embodiment, it is difficult to completely block the powder 100 that flies toward the recoater 5. However, since most of the scattered object adheres to and deposits on the top surface of the shielding top plate 49, amount of the powder that falls from the upper portion of the recoater 5 is very small. Thus, the apparatus of the present embodiment can more stably form an object than a conventional apparatus.

Note that the powder 100 having accumulated on the shielding top plate 49 can be discharged to the outside, when the chamber is opened after an object is formed, by sucking the powder 100 by using, for example, a cleaner for removing dust.

In the present embodiment, since the shielding top plate 49 that serves as a shielding portion has no movable component, the configuration of the additive manufacturing apparatus 500 can be simplified.

In the fourth embodiment, an object was formed by stacking 400 layers on each other. The maximum dimensions of the object were 30×40×20 mm, and the object was formed in an area whose maximum dimensions were 30×40 mm. The formation of the object was completed without being stopped. The roller 7 was not damaged, and the accuracy in shape of the three-dimensionally shaped object satisfied predetermined specifications. When the apparatus was checked during the formation of the object and before the formation of one powder layer, there was almost no scattered object (i.e., powder used for forming the object) on the surface of the recoater 5. As described above, the forming apparatus of the present embodiment suppresses the scattered object from depositing on the recoater 5 and falling from the recoater 5 onto the forming area. Thus, the forming apparatus of the present embodiment performs highly stable forming operation and has excellent productivity.

Fifth Embodiment

Next, an additive manufacturing apparatus 600 of a fifth embodiment will be described with reference to FIG. 8. The same features as those of the first embodiment will be omitted.

In the above-described first to fourth embodiments, a solid member is used as a shielding portion. In the present embodiment, a fluid is used as a shielding portion. That is, in the present embodiment, the recoater 5 is shielded from the powder 100 by changing the trajectory of the powder 100, which flies toward the recoater 5 located at the waiting position, by using gas flow (air curtain).

Figure 8:
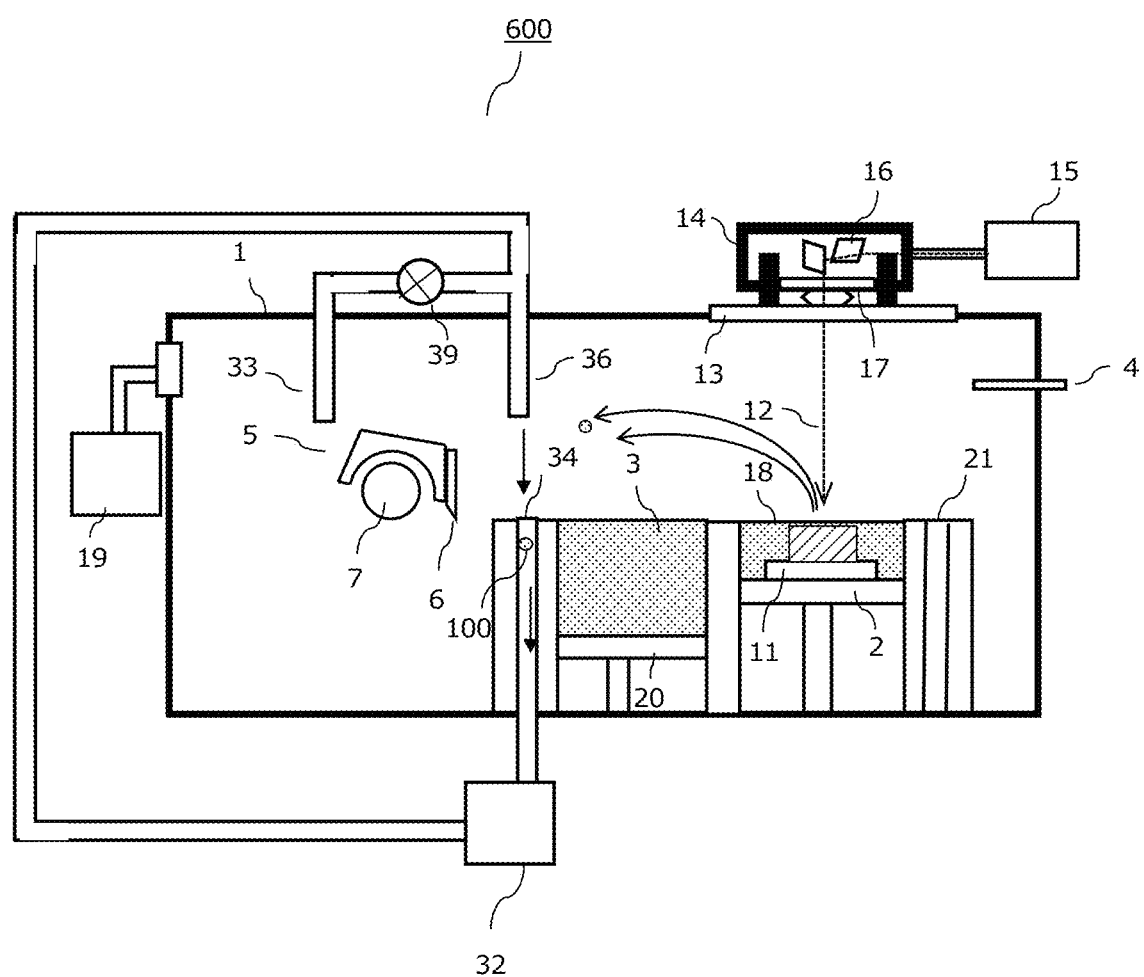
FIG. 8 is a schematic diagram illustrating a state where a powder layer is being irradiated with a laser beam in a fifth embodiment.

As illustrated in FIG. 8, a sheet nozzle 36 is disposed above a powder collection inlet 34, which is disposed between the forming stage 2 and the waiting position of the recoater 5. The powder collection inlet 34 is directly connected with a circulator 32 that catches and collects the powder by circulating gas. The circulator 32 takes in the gas and the powder from the powder collection inlet 34, catches only the powder, and returns the gas to the sheet nozzle 36.

The sheet nozzle 36 has an opening portion having a length of 40 cm in the depth direction of the apparatus and a length of 5 mm in the width direction of the apparatus. Thus, the sheet nozzle 36 blows a sheet-shaped gas having a width of about 40 cm. The flow rate of the gas from the sheet nozzle 36 is adjusted by a bypass nozzle 33 and a valve 39. The bypass nozzle 33 has an injection hole that is positioned separated from the forming area, and the valve 39 is used for controlling the flow rate of the gas that flows toward the bypass nozzle 33. For example, in a case where the circulation rate in the circulator 32 has a specification value of 1.6 cubic meters per minute and the opening area of the sheet nozzle 36 is 20 square centimeters, the speed of the gas flow is theoretically up to 8000 m/min, that is, up to 133 m/sec. Note that the gas injected from the bypass nozzle 33 may be blown on a surface of the recoater 5 for cleaning the surface.

After preparing the powder for forming an object, filling the powder supply tank with the powder, replacing the internal atmosphere of the chamber 1 with the N2 gas, and determining the origin of the forming plate in the vertical direction, the circulator 32 is started, and the valve 39 is controlled so that the speed of the gas flow from the sheet nozzle 36 is 20 m/sec. After that, the powder spreading and the laser irradiation are repeated for forming a three-dimensionally shaped object.

In the fifth embodiment, an object was formed by stacking 400 layers on each other. The maximum dimensions of the object were 30×40×20 mm, and the object was formed in an area whose maximum dimensions were 30×40 mm. The formation of the object was completed without being stopped. The roller 7 was not damaged, and the accuracy in shape of the three-dimensionally shaped object satisfied predetermined specifications. When the apparatus was checked during the formation of the object and before the formation of one powder layer, there was almost no scattered object (i.e., powder used for forming the object) on the surface of the recoater 5. As described above, the forming apparatus of the present embodiment prevents the scattered object from depositing on the recoater 5 and falling from the recoater 5 onto the forming area. Thus, the forming apparatus of the present embodiment performs highly stable forming operation and has excellent productivity.

In the example illustrated in FIG. 8, the gas injected from the sheet nozzle 36 is circulated by the circulator 32, and reused. However, the gas may be discharged to the outside, without being circulated. In this case, new gas may be injected from the sheet nozzle 36. In addition, in the example illustrated in FIG. 8, the gas injected from the sheet nozzle 36 is collected through the powder collection inlet 34, which is disposed directly below the sheet nozzle 36. However, the powder collection inlet 34 may be disposed at any place, such as a side surface of the chamber 1, as long as any problem, such as the rise of the powder due to the gas flow, does not occur. In another case, the vacuum pump 19 may be provided with a pressure adjustment mechanism, and the gas may be discharged to the vacuum pump 19.

Sixth Embodiment

Next, an additive manufacturing apparatus 700 of a sixth embodiment will be described with reference to FIGS. 9A and 9B. The same features as those of the first embodiment will be omitted.

In the above-described first to third embodiments, a movable member is used as a shielding portion, and part or all of the shielding portion is moved when the recoater 5 is moved in the horizontal direction, for retracting the shielding portion so as not to interfere with the recoater 5. In the present embodiment, however, the shielding portion contacts the recoater 5 when the recoater 5 is moved in the horizontal direction, but easily deforms in accordance with the movement of the recoater 5. Specifically, a flexible curtain 59 is disposed as a shielding portion.

Figure 9A:
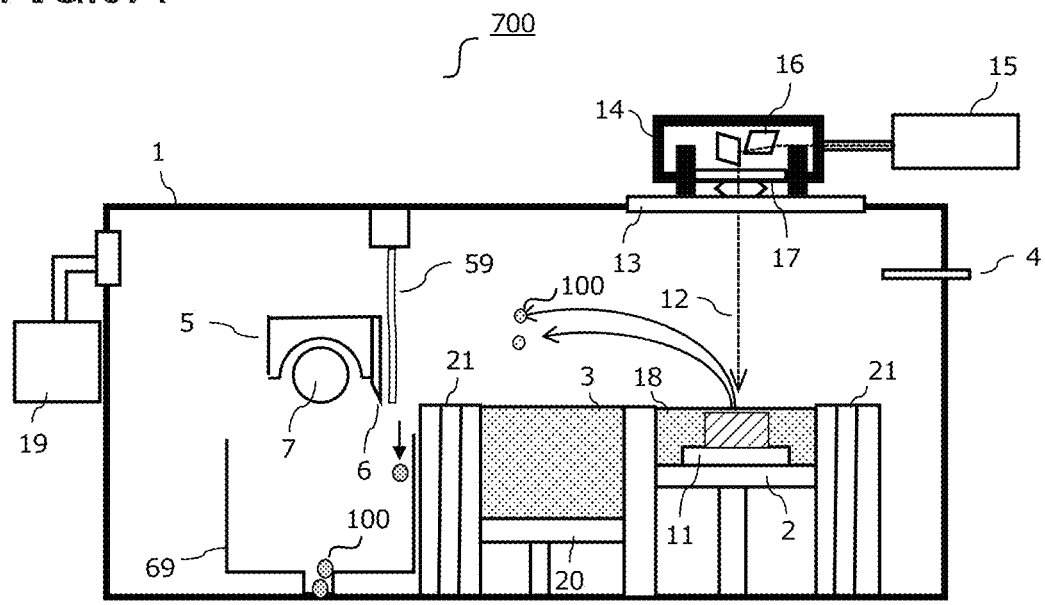
FIG. 9A is a schematic diagram illustrating a state where a powder layer is being irradiated with a laser beam in a sixth embodiment.
Figure 9B:
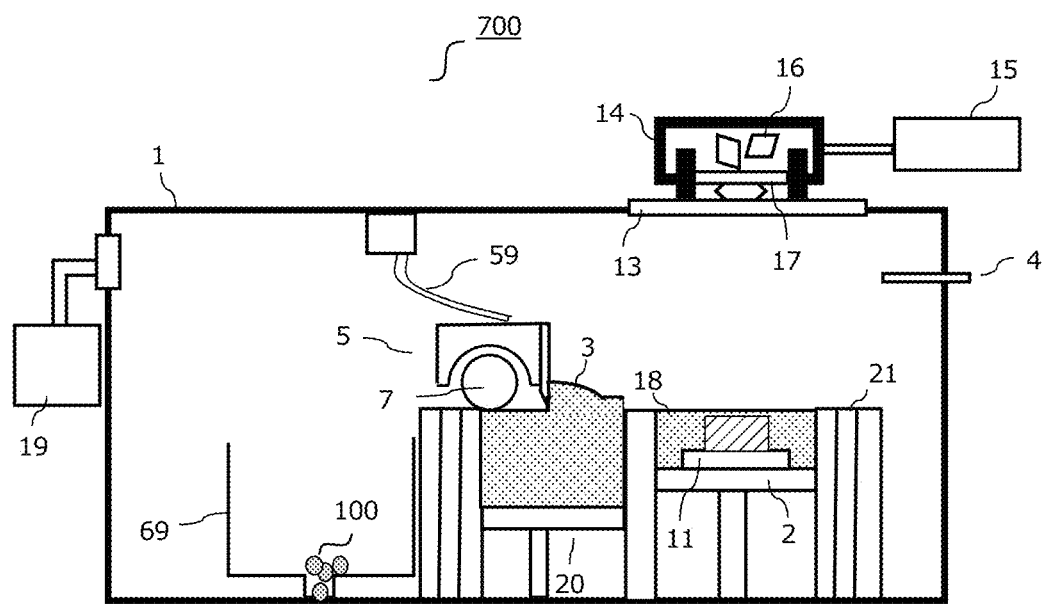
FIG. 9B is a schematic diagram illustrating one stage of a powder-layer forming process of the sixth embodiment.

As illustrated in FIG. 9A, the curtain 59 that serves as a shielding portion is disposed in a space between the waiting position of the recoater 5 and the powder supply tank 3. The length of the curtain 59 is determined so that at least the lowest portion of the curtain 59 is lower than the top surface of the recoater 5. The curtain 59 is made of a flexible material, such as a resin-based material (e.g., silicone rubber or fluororubber). For example, the curtain 59 may be a sheet material, FB750N, made by Kureha Elastomer Co., Ltd. Specifically, the sheet material is made of fluororubber, and has a thickness of 1 mm. The sheet material is attached to the ceiling of the chamber 1, as the curtain 59.

As illustrated in FIG. 9A, in the present embodiment, the powder 100 having collided with the curtain 59 falls, without adhering to the curtain 59. For example, the surface of the curtain 59 may be coated with a material to which the powder 100 hardly adheres. In another case, the curtain 59 may be provided with a mechanism that applies ultrasonic vibration to the curtain 59, or the curtain 59 may be provided with a mechanism that blows gas on the surface of the curtain 59. A collection container 69 is disposed below the curtain 59, for collecting the powder 100 that falls from the curtain 59. The collection container 69 is connected with a dust collector (not illustrated) for preventing the collected powder 100 from scattering in the apparatus and adhering to the curtain 59 again. Note that the collected powder 100 may be reused as the material powder for forming an object.

In the present embodiment, the curtain 59 is made of a flexible material to which the powder 100 hardly adheres. Thus, as illustrated in FIG. 9B, any problem does not occur even when the recoater 5 moves in the R or L direction for spreading powder and contacts the curtain 59. Thus, the shielding portion can block the powder without using any complicated mechanism.

In the sixth embodiment, an object was formed by stacking 400 layers on each other. The maximum dimensions of the object were 30×40×20 mm, and the object was formed in an area whose maximum dimensions were 30×40 mm. The formation of the object was completed without being stopped. The roller 7 was not damaged, and the accuracy in shape of the three-dimensionally shaped object satisfied predetermined specifications. When the apparatus was checked during the formation of the object and before the formation of one powder layer, there was almost no scattered object (i.e., powder used for forming the object) on the surface of the recoater 5. As described above, the forming apparatus of the present embodiment prevents the scattered object from depositing on the recoater 5 and falling from the recoater 5 onto the forming area. Thus, the forming apparatus of the present embodiment performs highly stable forming operation and has excellent productivity.

Figure 10A:
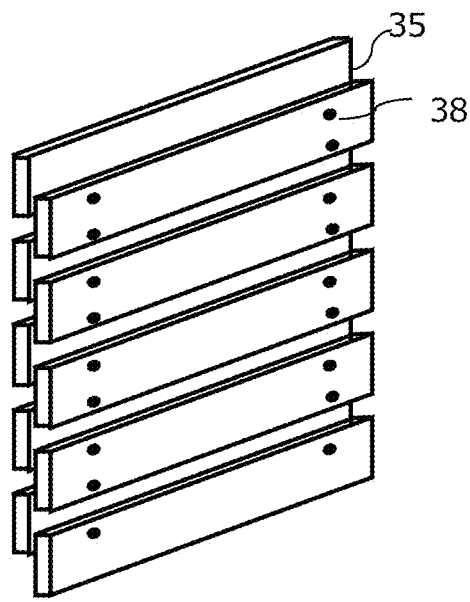
FIG. 10A is a perspective view of a metal curtain that is a modification of the sixth embodiment.
Figure 10B:
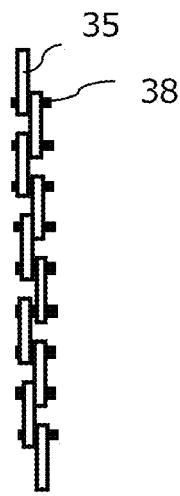
FIG. 10B is a side view of the metal curtain in a state where the metal curtain is straight.
Figure 10C:
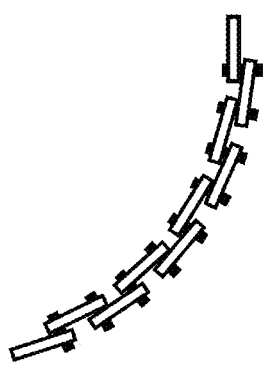
FIG. 10C is a side view of the metal curtain in a state where the metal curtain is curved.

In a modification of the sixth embodiment, a metallic curtain may be used instead of the curtain made of a flexible material and formed as one body. For example, as illustrated in FIGS. 10A to 10C, the metallic curtain is made such that thin metal plates 35 are connected with each other via rivets 38. As illustrated in the perspective view of FIG. 10A and the side view of FIG. 10B, the metallic curtain is made such that one thin metal plate 35 having holes for rivets are connected with another thin metal plate 35 having holes for rivets, via the rivets 38. FIGS. 10A and 10B illustrate a state in which the curtain is not in contact with the recoater 5, that is, a state in which the curtain is hanging down in the vertical direction. The side view of FIG. 10C illustrates a state in which the curtain is in contact with the recoater 5, that is, a state in which the curtain is bent by the external force. The hole for a rivet is made larger than the shaft diameter of the rivet 38, for forming play. Thus, the posture of the thin metal plates 35 can be changed to some extent, so that the flexibility necessary for the curtain can be achieved as a whole. Thus, even in a case where members made of a less flexible material, such as metal, are used, the use of such a connection method can achieve the curtain that has a shielding function, and that does not impede the movement of the recoater 5. The metallic curtain can be suitably used for a case where the curtain is required to have high durability as a shielding portion, or for a case where an electron beam is used as the energy beam for heating a powder layer and a vacuum is produced in the chamber.

Seventh Embodiment

Figure 15:
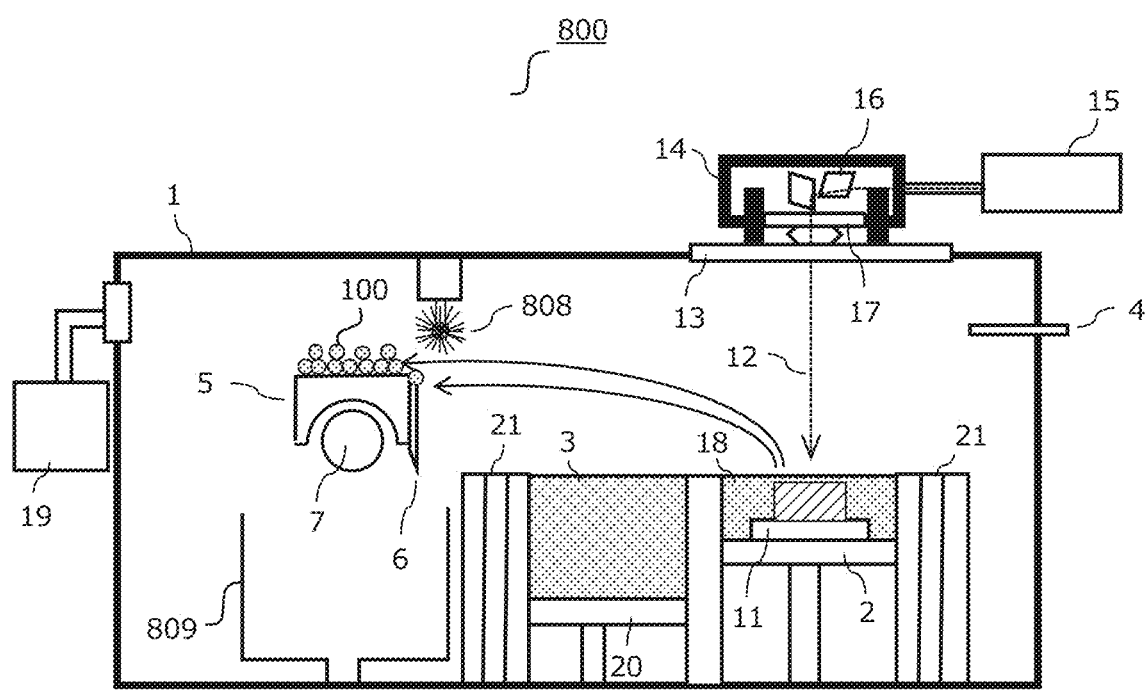
FIG. 15 is a schematic diagram illustrating a state where a powder layer is being irradiated with a laser beam in an additive manufacturing apparatus of a seventh embodiment.

Next, an additive manufacturing apparatus 800 of a seventh embodiment will be described with reference to FIG. 15. The same features as those of the first embodiment will be omitted. The present embodiment differs from the first to the sixth embodiments in that the additive manufacturing apparatus 800 includes a removal portion instead of the shielding member of the first to the sixth embodiments. The removal portion removes the scattered object having adhered to the surface of the recoater 5. In the present embodiment, after one powder layer is irradiated with the laser beam 12 and before the next powder spreading process is started, a feature operation is performed. Specifically, the scattered object having adhered to the surface of the recoater 5, in particular, having deposited on the top surface of the recoater 5 is removed by using a rolling brush roll 808.

The rolling brush roll 808 is a feature of the present embodiment that serves as a removal portion, and is disposed in the vicinity of the waiting position of the recoater 5. The rolling brush roll 808 that serves as a removal portion is supported so that the rolling brush roll 808 can move vertically and horizontally, while rotating, for removing the scattered object having adhered to the surface of the recoater 5. For example, the rolling brush roll 808 of the present embodiment has a diameter (Φ) of 18 mm, and the brush is made of fiber that is made of a material, such as carbon or horsehair. The above-described material is used for preventing the occurrence of static electricity and the damage of the surface of the recoater 5 when the scattered object (powder) having adhered to the surface of the recoater 5 is removed by the rolling brush roll 808. A collection container 809 is disposed below the waiting position of the recoater 5, for collecting the powder removed from the surface of the recoater 5.

Figure 16A:
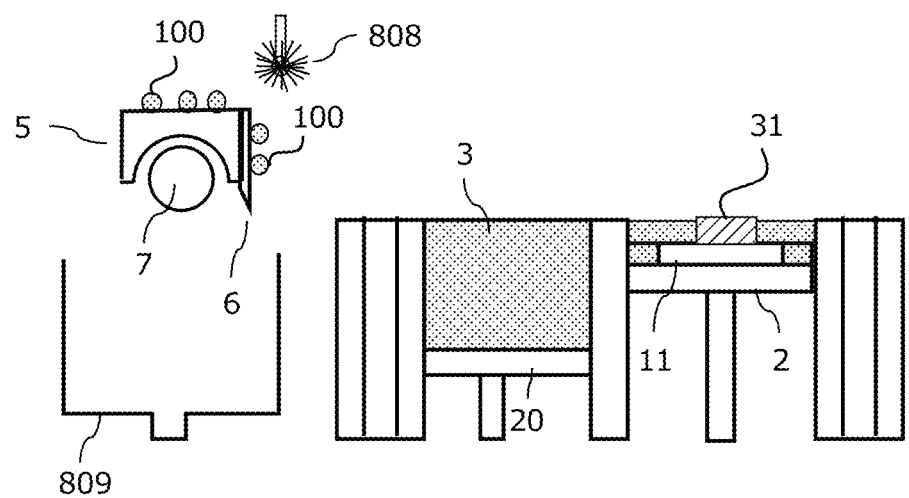
FIG. 16A is a schematic diagram illustrating a state after a powder layer is irradiated with the laser beam in the seventh embodiment.

FIG. 16A schematically illustrates a state of the recoater 5, observed after a powder layer is irradiated with the laser beam and a solidified portion 31 that constitutes a three-dimensionally shaped object is formed. As illustrated in FIG. 16A, the powder 100 has adhered to the top surface and the right side-surface of the recoater 5 that is located at the waiting position. The rolling brush roll 808 is located above the waiting position of the recoater 5.

Figure 16B:
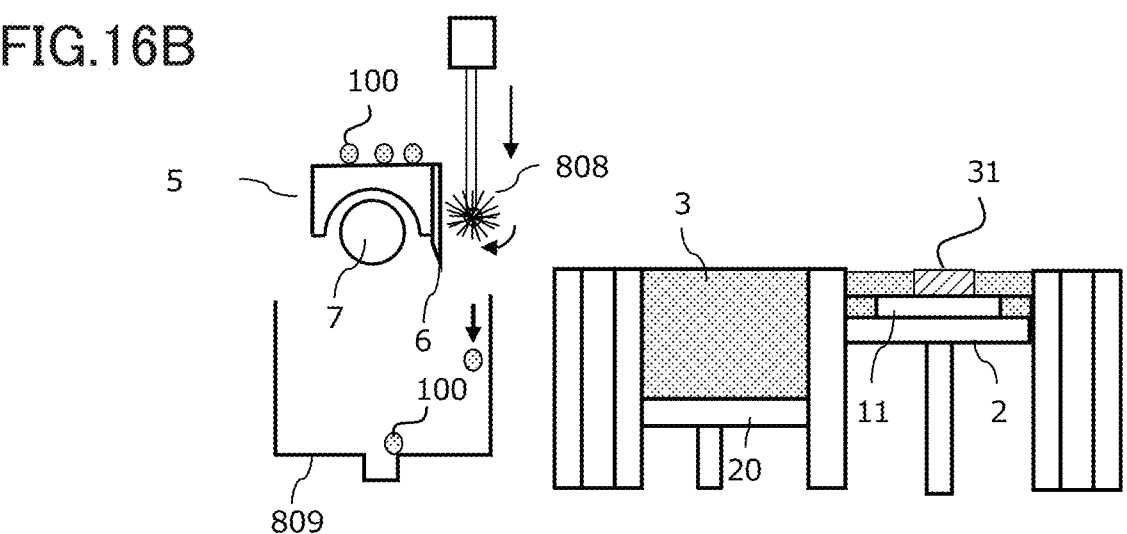
FIG. 16B is a schematic diagram illustrating a state where the right side-surface of the recoater is being cleaned by using a rolling brush roll in the seventh embodiment.

For removing the scattered object having adhered to the surface of the recoater 5, the rolling brush roll 808 is first moved downward, while rotated, by an actuator, as illustrated in FIG. 16B. In this operation, the rotational speed of the rolling brush roll 808 is set at 200 rpm for example, and the rotating brush is moved downward while sliding on the right side-surface of the recoater 5 (i.e., the front side-surface of the squeegee 6), for removing the scattered object (i.e., the powder 100) having adhered to the recoater 5. The rolling brush roll 808 may go and back several times in the vertical direction.

Figure 16C:
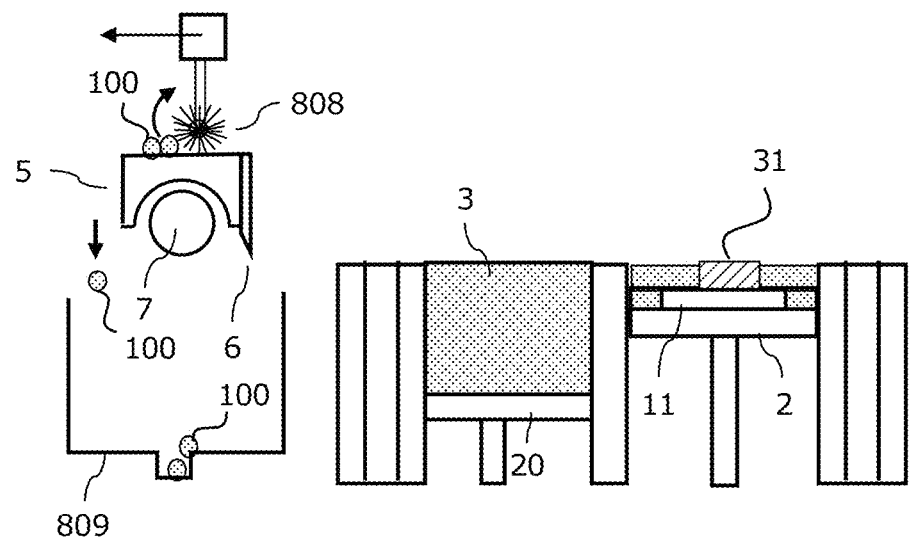
FIG. 16C is a schematic diagram illustrating a state where the top surface of the recoater is being cleaned by using the rolling brush roll in the seventh embodiment.

Then, as illustrated in FIG. 16C, the height of the rolling brush roll 808 is set equal to the height of the top surface of the recoater 5, and the rolling brush roll 808 is moved in the L direction, while rotated, by a horizontal-movement mechanism (not illustrated), such as a rail, for removing the scattered object having deposited on the top surface of the recoater 5. The rolling brush roll 808 may go and back several times in the right-and-left direction (i.e., the L-R direction).

In most cases, the above-described removal process may not be performed on the left side-surface of the recoater 5 because the scattered object hardly adheres to the left side-surface of the recoater 5. However, there is a case in which when the scattered object having deposited on the top surface of the recoater 5 is removed, the scattered object adheres to the back surface of the recoater 5. Thus, after the scattered object having deposited on the top surface of the recoater 5 is removed, the rolling brush roll 808 may be moved downward along the left side-surface of the recoater 5 for removing the scattered object having adhered to the left side-surface of the recoater 5.

The above-described scattered-object removal process may be performed every time a powder layer has been irradiated with the laser beam, that is, after the powder layer is irradiated with the laser beam and before the next powder spreading is started. In another case, the scattered-object removal process may be performed every time the irradiation of the laser beam and the powder spreading have been performed predetermined times.

In addition, although the right side-surface of the recoater 5 is cleaned first and then the top surface is cleaned in the above-described example, the cleaning may be performed in the reverse order.

In the present embodiment, the scattered object that is removed from the recoater 5 in the above-described process is collected by a collection container 809, which serves as a collection portion. The collection container 809 is connected with a dust collector (not illustrated) for preventing the removed scattered object from scattering in the apparatus again. Note that the collected powder may be reused as the material powder for forming an object.

Figure 17A:
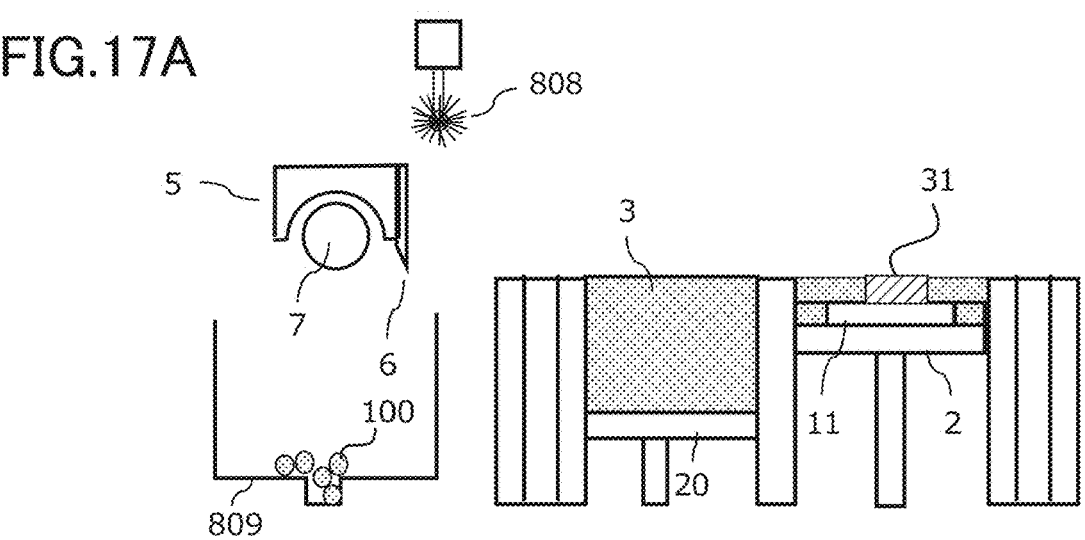
FIG. 17A is a schematic diagram illustrating a state where the cleaning is completed in the seventh embodiment.

FIG. 17A schematically illustrates the recoater 5 in a state where the cleaning by the rolling brush roll 808 is completed and the powder 100 having adhered to the recoater 5 has been removed. The rolling brush roll 808 is being retracted at a position (i.e., an upper position) at which the rolling brush roll 808 does not interfere with the recoater 5.

Figure 17B:
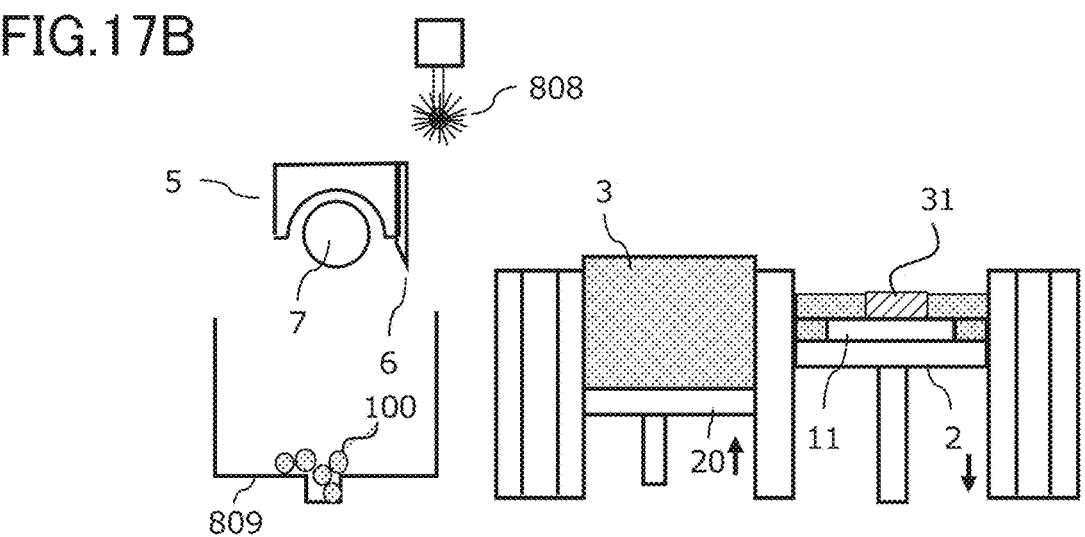
FIG. 17B is a schematic diagram illustrating one stage of a powder-layer forming process of the seventh embodiment, performed after the cleaning is completed.

Then, as illustrated in FIG. 17B, the powder supply stage 20 that supports the powder supply tank 3 is lifted for pushing up the powder, and the forming stage 2 is lowered.

Figure 17C:
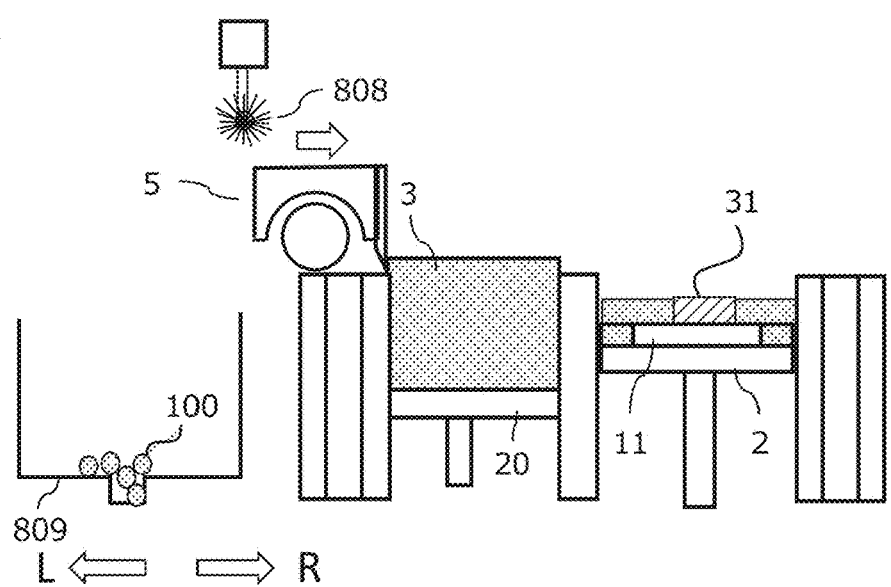
FIG. 17C is a schematic diagram illustrating the next one stage of the powder-layer forming process of the seventh embodiment, performed after the cleaning is completed.

Then, as illustrated in FIG. 17C, the posture of the squeegee 6 is adjusted such that the lower edge surface of the squeegee 6 has the same height as that of the lowest portion of the roller 7, and the recoater 5 is moved in the R direction. Specifically, the recoater 5 is moved in the R direction for conveying a predetermined amount of powder, which is necessary for spreading powder, to the left side of the forming stage 2.

Figure 18A:
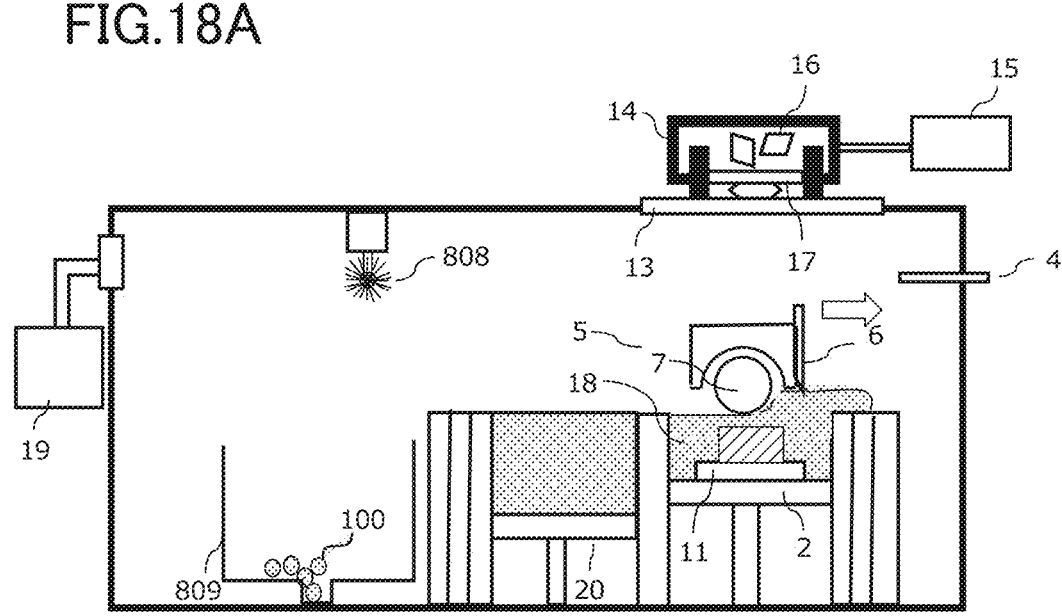
FIG. 18A is a schematic diagram illustrating the further next one stage of the powder-layer forming process of the seventh embodiment, performed after the cleaning is completed.

Then, as illustrated in FIG. 18A, the posture of the squeegee 6 is adjusted such that the lower edge surface of the squeegee 6 is higher than the lowest portion of the roller 7, and the recoater 5 is moved in the R direction. While the recoater 5 is moved to the right side of the forming stage 2, the powder is spread on the forming stage 2 by using only the roller 7. Then, the recoater 5 is moved in the L direction for forming a powder layer having a uniform thickness.

As illustrated in FIG. 18A, in the present embodiment, the recoater 5 is moved in a space above the forming stage 2 after the powder 100 having adhered to the recoater 5 is removed. Thus, there is no case in which the powder 100 having adhered to the recoater 5 falls onto the powder layer 18 and forms a pile of powder as in the conventional apparatus.

Thus, it is possible to suppress the unintentional projection from being formed when solidified layers are stacked on each other by using the above-described silicon carbide powder and the metal boride powder whose melting point is lower than the sublimation temperature of silicon carbide, and by repeating the formation of powder layer and the irradiation of energy beam.

In the above-described embodiment, an object was formed by stacking 400 layers on each other. The maximum dimensions of the object were 30×40×20 mm, and the object was formed in an area whose maximum dimensions were 30×40 mm. The formation of the object was completed without being stopped. The roller 7 was not damaged, and the accuracy in shape of the three-dimensionally shaped object satisfied predetermined specifications. When the apparatus was checked during the formation of the object and before the formation of one powder layer, there was almost no scattered object (i.e., powder used for forming the object) on the surface of the recoater 5 after the cleaning operation. As described above, the forming apparatus of the present embodiment prevents the scattered object from depositing on the recoater 5 and falling from the recoater 5 onto the forming area. Thus, the forming apparatus of the present embodiment performs highly stable forming operation and has excellent productivity.

Eighth Embodiment

Figure 18B:
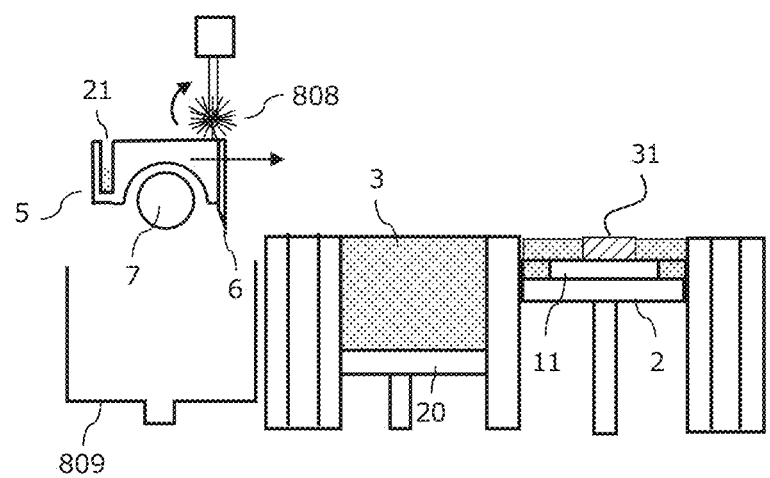
FIG. 18B is a schematic diagram illustrating a state where the top surface of the recoater is being cleaned by using a rolling brush roll in an eighth embodiment.

Next, an eighth embodiment will be described with reference to FIG. 18B. The same features as those of the seventh embodiment will be omitted. In the above-described seventh embodiment, the rolling brush roll 808 that serves as a removal portion is moved vertically and horizontally for cleaning the recoater 5. In the eighth embodiment, the position of the rolling brush roll 808 that serves as a removal portion is fixed. As illustrated in FIG. 18B, the rolling brush roll 808 is fixed at a position at which the rolling brush roll 808 can contact the recoater 5. When the recoater 5 is moved in the R or L direction for spreading powder, the scattered object having adhered to the top surface of the recoater 5 is removed by rotating the rolling brush roll 808. The rolling brush roll 808 slides on the recoater 5 when the powder spreading is started, and when the recoater 5 returns to the waiting position after finishing the powder spreading. Thus, at these timings, the scattered object on the recoater 5 is removed.

Preferably, the rolling brush roll 808 rotates such that the brush rotates toward a direction opposite to a direction toward which the recoater 5 moves. In another case, the rolling brush roll 808 may rotates, depending on the movement of the recoater 5. This is because the scattered object on the recoater 5 is removed to some extent by the movement of the recoater 5 even when the rolling brush roll 808 is not actively rotated. In the present embodiment, it is difficult to remove the scattered object having adhered to the front surface and the back surface of the recoater 5. However, since most of the scattered object adheres to the top surface of the recoater 5, an object can be more stably formed in the apparatus of the present embodiment than in a conventional apparatus.

In the present embodiment, as illustrated in FIG. 18B, a collection groove 21 is formed in an upper portion of the recoater 5, as a collection portion that collects the powder having adhered to the surface of the recoater 5. The collection groove 21 has a sufficient depth and a sufficient capacity, and when the powder having deposited on the top surface of the recoater 5 is removed by using the fixed rolling brush roll 808 and moving the recoater 5 horizontally, the powder is forced to fall into the collection groove 21, and is collected. Once the powder falls into the collection groove 21, the powder does not fall out of the recoater 5 in the powder-layer forming operation. The powder having accumulated in the collection groove 21 can be discharged to the outside, when the chamber is opened after an object is formed, by sucking the powder by using a cleaner for removing dust, which is connected to a nozzle-connection opening portion (not illustrated) disposed in the vicinity of the collection groove 21. In another case, while an object is being formed, or while the chamber is being closed after the object is formed, the powder having accumulated in the collection groove 21 may be dropped to the powder supply tank 3 by opening an open-and-close shutter disposed in a bottom portion of the collection groove 21, and may be reused.

In the example illustrated in FIG. 18B, both the collection groove 21 and the collection container 809 are used. However, any one of the collection groove 21 and the collection container 809 may be used. For example, an apparatus that forms a relatively small three-dimensionally shaped object may include the collection groove 21, and may not include the collection container 809.

Ninth Embodiment

Next, a ninth embodiment will be described with reference to FIG. 19A. The same features as those of the seventh embodiment will be omitted. In the above-described seventh or eighth embodiment, the rolling brush roller is used as a cleaner that removes the powder having adhered to the surface of the recoater 5. The present embodiment differs from the seventh and the eighth embodiments in that the present embodiment uses a nozzle, as a removal portion, that blows gas on the recoater 5.

In the present embodiment, the powder having adhered to the surface of the recoater 5 is removed from the surface by blowing the gas on the recoater 5. In the example illustrated in FIG. 19A, a removal nozzle 810 is disposed above the waiting position of the recoater 5, and injects inert gas. The gas injected from the removal nozzle 810 is N2 gas that is identical to the atmosphere gas introduced into the chamber. The width (in the depth direction in FIG. 19A) of the opening portion of the nozzle, which injects the N2 gas, is 400 mm, and the height of the opening portion is 5 mm.

For example, the removal nozzle 810 is adjusted so that the flow rate of the gas injected from the removal nozzle 810 is 600 L/min and the speed of flow of the gas injected from the removal nozzle 810 is 5 m/s. The N2 gas is blown from the removal nozzle 810 onto the top surface of the recoater 5, so that the scattered object having deposited on the recoater 5 is removed. The mixed powder of the silicon carbide powder and the chromium diboride powder, used in the present embodiment, can be blown off by the N2 gas with the speed of flow of 5 m/s. The flow rate and the speed of flow of the gas may be changed as appropriate in accordance with the material powder used.

In the present embodiment, the powder on the recoater 5 is removed by injecting the N2 gas from the removal nozzle 810 after a powder layer is irradiated with the laser beam and while the recoater 5 is at rest at the waiting position. However, the timing at which the N2 gas is injected from the removal nozzle 810 is not limited to the above-described timing. For example, the N2 gas may be blown on the recoater 5 while a powder layer is being irradiated with the laser beam. In addition, as illustrated in FIG. 19A, the N2 gas may be injected from the removal nozzle 810 and may remove the scattered object having deposited on the top surface of the recoater 5 when the recoater 5 is moving rightward (i.e., in the R direction) for performing the powder spreading operation. In short, the removal nozzle 810 has only to take a position relative to the recoater 5 that allows the removal nozzle 810 to blow the gas on the whole of the top surface of the recoater 5.

Figure 19A:
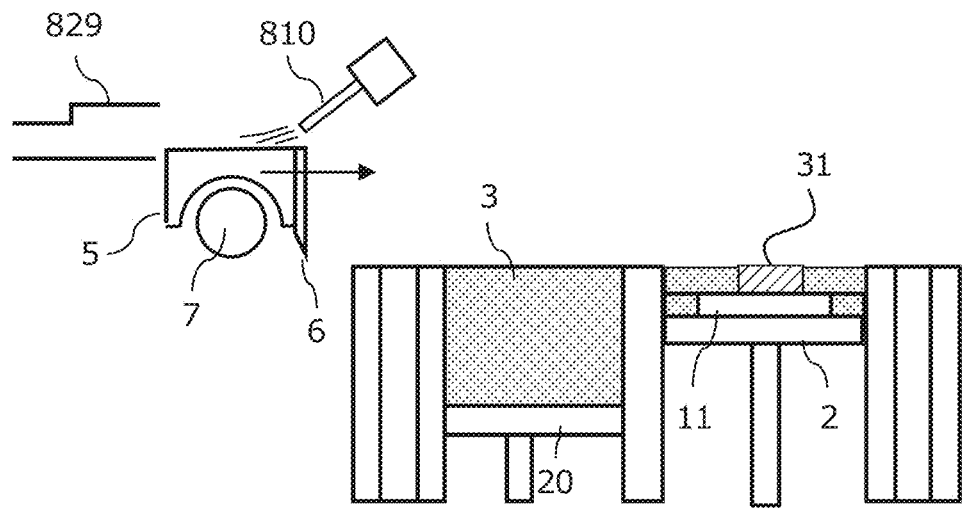
FIG. 19A is a schematic diagram illustrating a state where the top surface of the recoater is being cleaned, in a ninth embodiment, by using a nozzle that blows gas.

In the present embodiment, a collection inlet 829 is disposed on the left side of the recoater 5, as illustrated in FIG. 19A, for preventing the powder blown off by the gas, from scattering in the apparatus again. The collection inlet 829 that serves as a collection portion is connected with a dust collector (not illustrated) for reliably collecting the scattered object having deposited on the recoater 5.

In the present embodiment as illustrated in FIG. 19A, it is difficult to remove the scattered object having adhered to the front surface and the back surface of the recoater 5. However, since most of the scattered object adheres to the top surface of the recoater 5, an object can be more stably formed in the apparatus of the present embodiment than in a conventional apparatus.

Note that although the configuration of the apparatus will become a little complicated, the gas may be blown on the front surface (i.e., the right side-surface) of the recoater 5 by changing the direction in which the gas is injected from the removal nozzle 810. In this case, it is preferable that the collection container 809 used in the seventh embodiment is disposed in addition to the collection inlet 829.

Tenth Embodiment

Figure 19B:
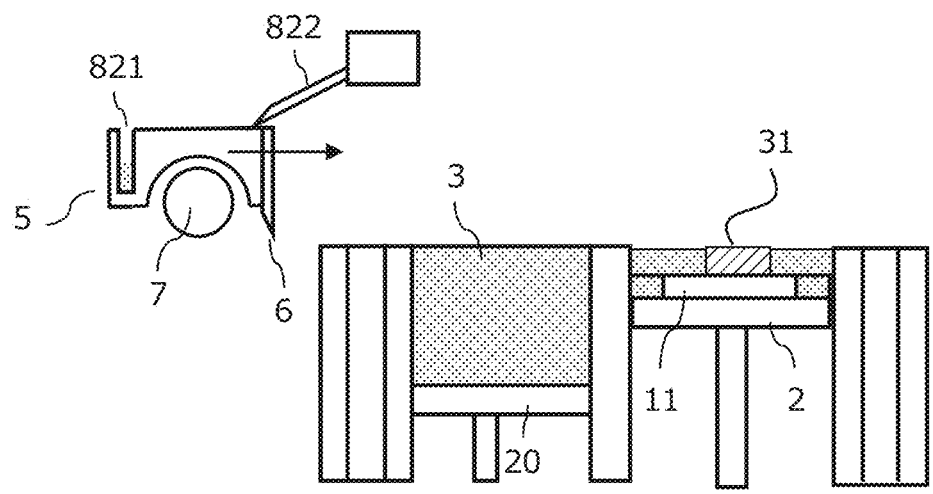
FIG. 19B is a schematic diagram illustrating a state where the top surface of the recoater is being cleaned by using a scraper in a tenth embodiment.

Next, a tenth embodiment will be described with reference to FIG. 19B. The same features as those of the first embodiment will be omitted. In the above-described seventh or eighth embodiment, the rolling brush roller is used as a cleaner that removes the powder having adhered to the surface of the recoater 5. In addition, in the above-described ninth embodiment, the nozzle is used for blowing the gas on the recoater 5. The present embodiment differs from the seventh to the ninth embodiments in that the present embodiment uses a scraper 822 as a removal portion.

In the present embodiment, the top surface of the recoater 5 and the scraper 822 slides on each other, so that the powder having adhered to the recoater 5 is removed from the surface of the recoater 5.

In the present embodiment, after a powder layer is irradiated with the laser beam and while the recoater 5 is at rest at the waiting position, the scraper 822 moves horizontally and slides on the top surface of the recoater 5, so that the powder on the recoater 5 is removed. However, the timing at which the scraper 822 slides on the recoater 5 is not limited to the above-described timing. For example, the scraper 822 may slide on the recoater 5 while a powder layer is being irradiated with the laser beam. In addition, as illustrated in FIG. 19B, the scraper 822 may be brought into contact with the recoater 5 and may remove the scattered object having deposited on the top surface of the recoater 5, when the recoater 5 is moving rightward (i.e., in the R direction) for performing the powder spreading operation. In short, the scraper 822 has only to move so as to slide on the whole of the top surface of the recoater 5.

In the present embodiment, a collection groove 821 is formed in an upper portion of the recoater 5, as a collection portion that collects the powder having adhered to the surface of the recoater 5. The collection groove 821 has a sufficient depth and a sufficient capacity, and the powder is forced to fall into the collection groove 821, and is collected. Once the powder falls into the collection groove 821, the powder does not fall out of the recoater 5 in the powder-layer forming operation. The powder having accumulated in the collection groove 821 can be discharged to the outside, when the chamber is opened after an object is formed, by sucking the powder by using a cleaner for removing dust, which is connected to a nozzle-connection opening portion (not illustrated) disposed in the vicinity of the collection groove 821. In another case, while an object is being formed, or while the chamber is being closed after the object is formed, the powder having accumulated in the collection groove 821 may be dropped to the powder supply tank 3 by opening an open-and-close shutter disposed in a bottom portion of the collection groove 821, and may be reused.

In the present embodiment, it is difficult to remove the scattered object having adhered to the front surface and the back surface of the recoater 5. However, since most of the scattered object adheres to the top surface of the recoater 5, an object can be more stably formed in the apparatus of the present embodiment than in a conventional apparatus.

Note that although the configuration of the apparatus will become a little complicated, the scraper 822 may be provided with a vertical-movement mechanism so that the scraper 822 can slides also on the front surface (i.e., the right side-surface) of the recoater 5. In this case, it is preferable that the collection container 69 used in the sixth embodiment is disposed in addition to the collection groove 821.

Modifications

The present invention is not limited to the above-described embodiments, and can be modified or combined within the technical concept of the present invention.

The type and arrangement of the mechanism that prevents the powder from reaching the recoater 5 is not limited to those described as examples in the above-described embodiments. For example, one type of the shielding mechanism described as an example in one embodiment may be disposed in a position described in another embodiment. In short, the shielding portion has only to be disposed at a position at which the shielding portion blocks the trajectory of the powder that flies from a powder layer, which is being irradiated with the laser beam, toward the recoater 5. Typically, the position at which the shielding portion blocks the trajectory of the powder that flies from the powder layer toward the recoater 5 is a position at which the shielding portion blocks a parabolic trajectory along which the powder flies from the powder layer to the recoater 5. However, the position may be a position at which the shielding portion blocks a trajectory along which the powder flies toward the recoater 5 after the powder collides with an inner wall of the chamber and is reflected from the inner wall.

The method of removing the powder having adhered to the recoater 5 is not limited to the methods, as described as examples, that uses the rolling brush roll, that blows the gas on the recoater 5, and that uses the scraper. For example, the powder having adhered to the surface of the recoater 5 may be shaken down by shaking the surface of the recoater 5 by using an ultrasonic vibration apparatus or the like. In another case, a brush that does not rotate, or a soft member such as a sponge may be used.

In the above-described embodiments, the description has been made for the mixed powder of silicon carbide powder and chromium diboride powder. However, another mixed powder, other than the mixed powder of silicon carbide powder and chromium diboride powder, may be used. The eutectic phenomenon, which is utilized in the above-described embodiments, may not be utilized. For example, the sublimable silicon carbide powder and metal powder may be used. In this case, the molten metal serves as a binder that binds silicon carbide particles with each other. The sublimable material that is used as a constructional material may be silicon nitride (Si3N4), not silicon carbide (SiC). Thus, the present invention can produce the similar effects for a powder layer that contains the sublimable material. In addition, the material that forms eutectic together with the sublimable material may not be chromium diboride (CrB2), but be zirconium diboride (ZrB2), titanium diboride (TiB2), vanadium diboride (VB2), or the like. The present disclosure can produce the similar effects for another material, such as resin powder or metal powder, other than the sublimable material (e.g., silicon carbide). This is because when one portion of the other material is irradiated with the laser beam under a certain irradiation condition, the powder around the portion may be scattered due to the flash boiling and adhere to the surface of the recoater.

The energy beam used for heating the powder layer is not limited to the laser beam, and may be another type of optical beam or the electron beam. The atmosphere in the chamber is not limited to the N2 atmosphere, and may be changed as appropriate in accordance with a type of energy beam and a type of powder material, which are used for forming an object. In a case where an electron beam source is used as the energy beam source, a vacuum atmosphere is kept in the chamber. In this case, since the powder scattered, due to the sublimation, from around the portion irradiated with the energy beam is more than the powder scattered under the atmospheric pressure, the present disclosure can be applied more effectively.

In the above-described first to sixth embodiments, a shielding portion is provided for preventing the powder scattered from the powder layer, from reaching the powder-layer forming portion. In the above-described seventh to tenth embodiments, a removal portion is provided for removing the powder scattered from the powder layer and having adhered to the powder-layer forming portion. The present invention may be embodied as an additive manufacturing apparatus that includes both the shielding portion and the removal portion. In addition, the present invention may be embodied as a method of manufacturing a three-dimensionally shaped object. In this case, the method may perform both the shielding process and the removal process. The shielding process prevents the powder scattered from the powder layer, from reaching the powder-layer forming portion; and the removal process removes the powder scattered from the powder layer and having adhered to the powder-layer forming portion.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An additive manufacturing apparatus comprising:
a powder-layer forming portion configured to form a powder layer;
an energy beam source configured to irradiate the powder layer with an energy beam; and
a shielding portion configured to reduce powder reaching the powder-layer forming portion, the powder being scattered from the powder layer when the powder layer is irradiated with the energy beam by the energy beam source, and the shielding portion being capable of changing a position or a posture,
wherein the shielding portion is configured to take a straight posture when the powder layer is irradiated with the energy beam by the energy beam source,
wherein the shielding portion is configured to take a bent posture when the powder-layer forming portion forms the powder layer,
wherein the shielding portion is configured to change from the straight posture to the bent posture without interfering with the powder-layer forming portion, wherein the shielding portion includes a joint portion that is located higher than a top of the powder-layer forming portion, and the joint portion is configured to rotate to change the shielding portion from the straight posture to the bent posture, and
wherein the additive manufacturing apparatus is configured such that, when the shielding portion takes the bent posture, the shielding portion is located between the powder attached to the shielding portion and the powder-layer forming portion.

2. The additive manufacturing apparatus according to claim 1, wherein when the powder layer is irradiated with the energy beam by the energy beam source, the powder-layer forming portion is disposed at a waiting position, and the shielding portion is disposed between the waiting position and the powder layer.

3. The additive manufacturing apparatus according to claim 1, wherein when the powder-layer forming portion forms the powder layer, the shielding portion takes the posture or the position in which the shielding portion does not interfere with the powder-layer forming portion.

4. The additive manufacturing apparatus according to claim 1, wherein a lower edge of the shielding portion is lower than an upper edge of the powder-layer forming portion when the powder layer is irradiated with the energy beam by the energy beam source, and is higher than the upper edge of the powder-layer forming portion when the powder-layer forming portion forms the powder layer.

5. The additive manufacturing apparatus according to claim 2, wherein the shielding portion is disposed between the waiting position and a powder supply portion configured to store material powder.

6. The additive manufacturing apparatus according to claim 1, wherein the shielding portion is configured to drop the powder reaching the shielding portion.

7. The additive manufacturing apparatus according to claim 1, further comprising a collection portion configured to collect the powder reaching the shielding portion from the powder layer, the collection portion being disposed below the shielding portion.

8. The additive manufacturing apparatus according to claim 1, wherein the shielding portion is disposed above a powder supply portion configured to store material powder.

9. A method of manufacturing a three-dimensionally shaped object by using the additive manufacturing apparatus according to claim 1, the method comprising:
forming the powder layer by the powder-layer forming portion; and
irradiating, by the energy beam source, the powder layer with the energy beam,
wherein the forming and the irradiating are executed alternately and repeatedly, and
wherein in the irradiating, the shielding portion shields the powder-layer forming portion to reduce the powder reaching the powder-layer forming portion, the powder being scattered from the powder layer, and drops the powder reaching the shielding portion.

10. The additive manufacturing apparatus according to claim 1, further comprising:
a removal portion configured to remove the powder scattered from the powder layer and having adhered to the powder-layer forming portion,
wherein the removal portion includes a nozzle injecting a gas flow on a surface of the powder-layer forming portion.

11. A method of manufacturing a three-dimensionally shaped object by using the additive manufacturing apparatus according to claim 10, the method comprising:
forming the powder layer by the powder-layer forming portion;
irradiating, by the energy beam source, the powder layer with the energy beam; and
removing, by the removal portion, the powder scattered from the powder layer and having adhered to the powder-layer forming portion,
wherein the forming and the irradiating are executed alternately and repeatedly, and the removing is executed after the irradiating and before a next forming.

12. The additive manufacturing apparatus according to claim 1, further comprising:
a removal portion configured to remove a powder adhered to the powder-layer forming portion, when the removal portion is disposed above a height at which the powder layer is formed.

13. The additive manufacturing apparatus according to claim 12, wherein the removal portion is configured to remove a powder deposited on the powder-layer forming portion.

14. The additive manufacturing apparatus according to claim 12, wherein the removal portion is configured to be in contact with the powder-layer forming portion.

15. The additive manufacturing apparatus according to claim 14, wherein the removal portion is configured to move relative to the powder-layer forming portion.

16. The additive manufacturing apparatus according to claim 12, wherein the removal portion includes a brush configured to slide on a surface of the powder-layer forming portion.

17. The additive manufacturing apparatus according to claim 12, wherein the removal portion includes a scraper configured to slide on a surface of the powder-layer forming portion.

18. The additive manufacturing apparatus according to claim 12, further comprising a collection portion configured to collect the powder removed from the powder-layer forming portion by the removal portion.

19. A method of manufacturing a three-dimensionally shaped object by using the additive manufacturing apparatus according to claim 12, the method comprising:
forming the powder layer by moving the powder-layer forming portion onto the forming area;
irradiating, by the energy beam source, the powder layer with the energy beam; and
removing, by the removal portion, the powder scattered from the powder layer and adhered to the powder-layer forming portion,
wherein the forming and the irradiating are executed alternately and repeatedly, and the removing is executed after the irradiating and before a next forming.

20. A method of manufacturing a three-dimensionally shaped object by using the additive manufacturing apparatus according to claim 12, the method comprising:
forming the powder layer by moving the powder-layer forming portion onto the forming area;
irradiating, by the energy beam source, the powder layer with the energy beam; and
removing, by the removal portion, the powder scattered from the powder layer and deposited on the powder-layer forming portion,
wherein the forming and the irradiating are executed alternately and repeatedly, and the removing is executed after the irradiating and before a next forming.

21. A method of manufacturing a three-dimensionally shaped object by using the additive manufacturing apparatus according to claim 12, the method comprising:
forming the powder layer by the powder-layer forming portion;
irradiating, by the energy beam source, the powder layer with the energy beam; and
removing, by the removal portion, the powder scattered, in the irradiating, from the powder layer and adhered to the powder-layer forming portion,
wherein the forming and the irradiating are executed alternately and repeatedly, and the removing is executed after the irradiating and before a next forming.

* * * * *